(12) United States Patent
Audenaert

(10) Patent No.: US 10,675,658 B2
(45) Date of Patent: Jun. 9, 2020

(54) TREATED ARTICLE AND METHOD OF MAKING THE SAME

(71) Applicant: 3M INNOVATIVE PROPERTIES COMPANY, St. Paul, MN (US)

(72) Inventor: Frans A. Audenaert, Kaprijke (BE)

(73) Assignee: 3M Innovative Properties Company, St. Paul, MN (US)

( * ) Notice: Subject to any disclaimer, the term of this patent is extended or adjusted under 35 U.S.C. 154(b) by 307 days.

(21) Appl. No.: 15/126,655

(22) PCT Filed: Mar. 17, 2015

(86) PCT No.: PCT/US2015/021026
§ 371 (c)(1),
(2) Date: Sep. 16, 2016

(87) PCT Pub. No.: WO2015/142894
PCT Pub. Date: Sep. 24, 2015

(65) Prior Publication Data
US 2017/0081523 A1    Mar. 23, 2017

Related U.S. Application Data

(60) Provisional application No. 61/954,691, filed on Mar. 18, 2014.

(51) Int. Cl.

| | |
|---|---|
| *B05D 5/08* | (2006.01) |
| *B05D 7/14* | (2006.01) |
| *B05D 7/00* | (2006.01) |
| *B05D 1/02* | (2006.01) |
| *C09D 171/02* | (2006.01) |
| *C23C 22/00* | (2006.01) |
| *C08G 65/00* | (2006.01) |
| *C09D 183/16* | (2006.01) |
| *C23C 22/28* | (2006.01) |
| *C09D 183/08* | (2006.01) |
| *C08G 65/336* | (2006.01) |
| *C09D 7/40* | (2018.01) |
| *C09D 5/08* | (2006.01) |
| *C09D 5/00* | (2006.01) |
| *C23C 22/06* | (2006.01) |
| *C23C 22/50* | (2006.01) |
| *C23C 22/52* | (2006.01) |
| *C23C 22/53* | (2006.01) |
| *C23C 22/54* | (2006.01) |
| *C23C 22/56* | (2006.01) |
| *C23C 22/58* | (2006.01) |

(52) U.S. Cl.
CPC ............. *B05D 5/086* (2013.01); *B05D 1/02* (2013.01); *B05D 7/14* (2013.01); *B05D 7/52* (2013.01); *C08G 65/00* (2013.01); *C08G 65/007* (2013.01); *C08G 65/336* (2013.01); *C09D 5/00* (2013.01); *C09D 5/002* (2013.01); *C09D 5/082* (2013.01); *C09D 7/40* (2018.01); *C09D 171/02* (2013.01); *C09D 183/08* (2013.01); *C09D 183/16* (2013.01); *C23C 22/00* (2013.01); *C23C 22/06* (2013.01); *C23C 22/28* (2013.01); *C23C 22/50* (2013.01); *C23C 22/52* (2013.01); *C23C 22/53* (2013.01); *C23C 22/54* (2013.01); *C23C 22/56* (2013.01); *C23C 22/58* (2013.01); *B05D 5/083* (2013.01); *C08G 2650/48* (2013.01); *C23C 2222/20* (2013.01)

(58) Field of Classification Search
None
See application file for complete search history.

(56) References Cited

U.S. PATENT DOCUMENTS

| | | |
|---|---|---|
| 3,250,807 A | 5/1966 | Fritz |
| 3,250,808 A | 5/1966 | Moore |
| 3,646,085 A | 2/1972 | Bartlett |
| 3,810,874 A | 5/1974 | Mitsch |

(Continued)

FOREIGN PATENT DOCUMENTS

| | | |
|---|---|---|
| EP | 2463325 | 6/2012 |
| WO | WO 2003-018213 | 3/2003 |

(Continued)

OTHER PUBLICATIONS

Gelest; Silane Coupling Agents: Connecting Across Boundaries; 2006.*
Hoyt, "Plolysiloxane Networks with Hydrogen Bonding Pendant Moieties", Proceedings of the 24$^{th}$ Annual Meeting of the Adhesion Society, Feb. 25-28, 2001, pp. 474-476.

(Continued)

*Primary Examiner* — Michael P. Rodriguez

(57) ABSTRACT

A method of making a treated article having a metal surface. The method includes treating the metal surface with a primer composition comprising a secondary or tertiary amino-functional compound having at least two independently selected silane groups to provide a primed metal surface and subsequently treating the primed metal surface with a treatment composition comprising a fluorinated compound represented by formula Rf{—X—[Si(Y)$_{3-x}$(R)$_x$]$_y$}$_z$. An article treated by such a method is also disclosed. The use of a secondary or tertiary amino-functional compound having at least two independently selected silane groups as a primer for a metal surface before treatment with the fluorinated silane and a method of treating a metal surface with a treatment composition including the secondary or tertiary amino-functional compound having at least two independently selected silane groups and certain fluorinated silanes are also disclosed.

20 Claims, No Drawings

(56) References Cited

U.S. PATENT DOCUMENTS

| | | | |
|---|---|---|---|
| 4,647,413 A | 3/1987 | Savu |
| 5,274,159 A | 12/1993 | Pellerite |
| 5,578,278 A | 11/1996 | Fall |
| 5,658,962 A | 8/1997 | Moore |
| 6,200,684 B1 | 3/2001 | Yamaguchi |
| 6,277,485 B1 | 8/2001 | Invie |
| 6,592,659 B1 | 7/2003 | Terrazas |
| 6,613,860 B1 | 9/2003 | Dams |
| 6,656,258 B2 | 12/2003 | Elsbernd |
| 6,716,534 B2 | 4/2004 | Moore |
| 7,294,731 B1 | 11/2007 | Flynn |
| 7,338,996 B2 | 3/2008 | Fehn |
| 7,470,741 B2 | 12/2008 | Dams |
| 7,652,115 B2 | 1/2010 | Dams |
| 7,803,894 B2 | 9/2010 | Dams |
| 8,137,452 B2 | 3/2012 | Posset |
| 8,158,264 B2 | 4/2012 | David |
| 9,175,170 B2 | 11/2015 | Domes et al. |
| 9,388,315 B2 | 7/2016 | Hoshino |
| 2007/0054056 A1 | 3/2007 | Albert et al. |
| 2008/0220264 A1 | 9/2008 | Iyer |
| 2011/0195260 A1 | 8/2011 | Lee et al. |
| 2011/0281121 A1 | 11/2011 | He |

FOREIGN PATENT DOCUMENTS

| | | | |
|---|---|---|---|
| WO | WO 2006-079543 | 8/2006 | |
| WO | WO 2007-077136 | 7/2007 | |
| WO | WO 2010-060006 | 5/2010 | |
| WO | WO 2012-064653 | 5/2012 | |
| WO | WO 2012064653 A1 * | 5/2012 | ............... C09D 4/00 |
| WO | WO 2013-115191 | 8/2013 | |
| WO | WO 2014-011771 | 1/2014 | |
| WO | WO 2014011771 A2 * | 1/2014 | ............... C09D 4/00 |
| WO | WO 2015-179511 | 11/2015 | |
| WO | WO 2017-053345 | 3/2017 | |

OTHER PUBLICATIONS

Petrie, "Silanes as Primers and Adhesion Promoters for Metal Substrates", metalfinishing, Jul./Aug. 2007, pp. 85-93.

Silane Coupling Agents Connecting Across Boundaries, Gelest, Inc., 2006, 60 pages.

International Search Report for PCT International Application No. PCT/US2015/021026 dated May 19, 2015, 4 pages.

* cited by examiner

TREATED ARTICLE AND METHOD OF MAKING THE SAME

CROSS-REFERENCE TO RELATED APPLICATION

This application is a national stage filing under 35 U.S.C. 371 of PCT/US2015/021026, filed Mar. 17, 2015, which claims priority to U.S. Provisional Application No. 61/954, 691, filed Mar. 18, 2014, the disclosure of which is incorporated by reference in its entirety herein.

BACKGROUND

Various techniques have been used to impart repellent properties to a substrate. For example, silane compounds or compositions having one or more fluorinated groups have been successfully used for rendering substrates such as glass and ceramics oil- and water-repellent. Such silane compounds or compositions have typically included one or more hydrolysable groups and at least one fluorinated alkyl group or fluorinated polyether group. See, for example, U.S. Pat. Nos. 3,646,085; 5,274,159; 6,613,860; 6,716,534; 7,470,741; and 7,652,115 and Int. Pat. Appl. Pub. No. WO2010/060006. Substrates that have been treated for oil and water repellency include glass, ceramics such as bathroom tile, enamel, metals, natural and man-made stone, polymers, and wood.

Some surface modification techniques have been successfully used with metal surfaces (see, e.g., U.S. Pat. No. 8,158,264 (David et al.)), but some of these techniques are expensive and time-consuming and may be difficult to carry out on larger metal or metallized articles.

SUMMARY

While certain fluorinated silanes adhere well to glass and ceramics and provide a highly durable easy-to-clean coating to these substrates, typically these fluorinated silanes have not been as successful for treating metal surfaces. There continues to be a need for methods for imparting repellent properties to metal surfaces and for articles with metal surfaces having durable oil and water repellency.

Metal surfaces are found on a variety of commonly used articles in the home and outdoors. For example, metal surfaces are popular in kitchens and bathrooms and are used for faucets, shower heads, hand rails, range hoods, and other appliances. In another example, in automobiles, metal surfaces are used for exterior parts such as wheel rims. Such metal surfaces can come in contact with a variety of oily and aqueous deposits such as cooking or automotive oil or grease, food, soap, dirt, sand, and minerals (e.g., lime). These deposits, which may be in the form of fingerprints, stains, or smudges, tend to show up easily on the surface and can be difficult to remove. Removing these deposits often requires aggressive scrubbing, frequently with cleaners or detergents, which may challenge the esthetic appearance of the surface. Easy-to-clean metal surfaces that allow removal of oily and aqueous deposits without the need for aggressive scrubbing and that retain this property after repeated cleaning would, therefore, be advantageous. A method that can achieve this and articles made therefrom have now been found.

In one aspect, the present disclosure provides a method of making a treated article having a metal surface. The method includes treating the metal surface with a primer composition including a secondary or tertiary amino-functional compound having at least two independently selected silane groups to provide a primed metal surface and subsequently treating the primed metal surface with a treatment composition including a fluorinated compound represented by formula $Rf\{-X-[Si(Y)_{3-x}(R)_x]_y\}_z$. In this formula, Rf is a polyfluoropolyether group; X is a divalent or trivalent organic linking group; each Y is independently halogen, alkoxy, hydroxyl, acyloxy, polyalkyleneoxy, or aryloxy; R is an alkyl group having up to 8 carbon atoms or a phenyl group; x is 0 or 1 or 2; y is a value from 1 to 8; and z is 1 or 2.

In another aspect, the present disclosure provides a treated article having a metal surface treated according to any one of the embodiments of the above method. A layer is formed on at least a portion of the metal surface. The layer includes a secondary or tertiary amino-functional compound including at least one siloxane and at least one other group selected from the group consisting of siloxane, silanol, and silane. A fluorinated compound is bonded to the secondary or tertiary amino-functional compound, wherein the fluorinated compound is represented by formula $Rf\{-X-[Si(Y')_{3-x}(R)_x]_y\}_z$. In this formula, Rf is a polyfluoropolyether group; X is a divalent or trivalent organic linking group; each Y' is independently halogen, alkoxy, hydroxyl, acyloxy, polyalkyleneoxy, aryloxy, or —O-bonded to the secondary or tertiary amino-functional compound, forming the at least one siloxane; R is an alkyl group having up to 8 carbon atoms or a phenyl group; x is 0 or 1 or 2; y is a value from 1 to 8; and z is 1 or 2.

In another aspect, the present disclosure provides the use of secondary or tertiary amino-functional compound having at least two independently selected silane groups as a primer for a metal surface before treatment with a fluorinated compound represented by formula $Rf\{-X-[Si(Y)_{3-x}(R)_x]_y\}_z$, in which Rf, X, Y, R, x, y, and z are as defined above.

In some embodiments of the aforementioned method, treated article, or use, the fluorinated compound is represented by formula $Rf\{Q-X'-[Si(Y)_{3-x}(R)_x]_y\}_z$, in which Q is a bond, —C(O)—N(R)—, —C(O)—O—, or —SO$_2$N(R')—, where R' is hydrogen or alkyl having up to 4 carbon atoms; X' is a divalent or trivalent organic linking group including at least one of alkylene or arylalkylene, each of which is optionally interrupted by at least one functional group that is independently ether, thioether, sulfone, amine, ester, amide, carbamate, or urea, and Rf, Y, Y', R, x, y, and z are as defined above.

In another aspect, the present disclosure provides a method of making a treated article having a metal surface. The method includes treating the metal surface with a treatment composition including a secondary or tertiary amino-functional compound having at least two independently selected silane groups and a fluorinated compound represented by formula $Rf\{C(O)NR'-X''-[Si(Y)_{3-x}(R)_x]_y\}_z$. In this formula, Rf is a polyfluoropolyether group; X'' is a divalent or trivalent organic linking group including at least one of alkylene or arylalkylene, each of which is optionally interrupted by at least one carbamate or urea; each Y is independently halogen, alkoxy, hydroxyl, acyloxy, polyalkyleneoxy, or aryloxy; R is an alkyl group having up to 8 carbon atoms or a phenyl group; x is 0 or 1 or 2; y is a value from 1 to 8; and z is 1 or 2.

In another aspect, the present disclosure provides a treated article having a metal surface. A layer is formed on at least a portion of the metal surface. The layer includes a siloxane reaction product of a secondary or tertiary amino-functional compound having at least two independently selected silane groups and a fluorinated compound that is represented by formula $Rf\{C(O)NR'—X''—[Si(Y^1)_{3-x}(R)_x]_y\}_z$. In this formula each $Y^1$ is independently halogen, alkoxy, hydroxyl, acyloxy, polyalkyleneoxy, aryloxy, —O-bonded to the secondary or tertiary amino-functional compound, forming at least one siloxane bond, or —O-bonded to the metal surface; and Rf, X'', R, x, y, and z are as defined above.

In some embodiments of the aforementioned methods, treated articles, or use, the secondary or tertiary amino-functional compound is represented by formula $(R^3)_2N—R^1—[Si(Y^2)_p(R^2)_{3-p}]_q$, in which $R^1$ is a multivalent alkylene group optionally interrupted by one or more —O— groups or up to three —$NR^3$— groups; $R^2$ is alkyl or arylalkylenyl; each $R^3$ is independently hydrogen, alkyl, arylalkylenyl, or —$R^1$—$[Si(Y^2)_p(R^2)_{3-p}]$; $Y^2$ is alkoxy, acyloxy, aryloxy, hydroxyl, polyalkyleneoxy, or halogen; p is 1, 2, or 3; and q is 1, 2, or 3; provided that at least two independently selected —$Si(Y^2)_p(R^2)_{3-p}$ groups are present and that both $R^3$ groups are not hydrogen. In some embodiments, q is 1.

In some embodiments of the method described herein, a secondary or tertiary amino-functional silane having at least two independently selected silane groups provides surprisingly more durable easy-to-clean performance when used as a primer on a metal surface followed by a fluorinated silane than other amino-functional silanes such as primary amino-functional silanes having one silane group. In some embodiments of the method described herein, treatment compositions including both the secondary or tertiary amino-functional silane having at least two independently selected silane groups and fluorinated compounds represented by formula $Rf\{C(O)NR'—X''—[Si(Y^1)_{3-x}(R)_x]_y\}_z$ also provide more durable easy-to-clean performance than mixtures of the fluorinated compound represented by formula $Rf\{C(O)NR'—X''—[Si(Y^1)_{3-x}(R)_x]_y\}_z$ and other functional silanes.

As used herein, the terms "alkyl" and the prefix "alk" are inclusive of both straight chain and branched chain groups and of cyclic groups, e.g., cycloalkyl. Unless otherwise specified, these groups contain from 1 to 20 carbon atoms. In some embodiments, these groups have a total of up to 10 carbon atoms, up to 8 carbon atoms, up to 6 carbon atoms, or up to 4 carbon atoms. Cyclic groups can be monocyclic or polycyclic and preferably have from 3 to 10 ring carbon atoms.

The term "alkylene" is the divalent or trivalent form of the "alkyl" groups defined above.

Unless otherwise indicated, the term "halogen" refers to a halogen atom or one or more halogen atoms, including chlorine, bromine, iodine, and fluorine atoms.

The term "aryl" as used herein includes carbocyclic aromatic rings or ring systems optionally containing at least one heteroatom (i.e., O, N, or S). Examples of aryl groups include phenyl, naphthyl, biphenyl, and pyridinyl.

The term "arylene" is the divalent form of the "aryl" groups defined above.

"Arylalkylene" refers to an "alkylene" moiety to which an aryl group is attached.

"Arylalkylenyl" refers to a terminal aryl group attached an "alkylene" moiety.

The term "carbamate" refers to the group —O—C(O)—N(R')— wherein R' is as defined below.

The term "urea" refers to the group —N(R')—C(O)—N(R')— wherein each R' is independently as defined below.

The term "hydrolysable group" refers to a group which either is directly capable of undergoing condensation reactions under appropriate conditions or which is capable of hydrolyzing under appropriate conditions to yield a compound that is capable of undergoing condensation reactions. Appropriate conditions typically refers to the presence of water and optionally the presence of acid or base.

The term "non-hydrolysable group" refers to a group generally not capable of hydrolyzing under the appropriate conditions described above for hydrolyzing hydrolyzable groups, (e.g., acidic or basic aqueous conditions).

As used herein, "a," "an," "the," "at least one," and "one or more" are used interchangeably.

The phrases "at least one of" and "comprises at least one of" followed by a list refers to any one of the items in the list and any combination of two or more items in the list.

Also herein, the recitations of numerical ranges by endpoints include all numbers subsumed within that range, including the endpoints (e.g., 1 to 5 includes 1, 1.5, 2, 2.75, 3, 3.80, 4, 5, etc.). When the number is an integer, then only the whole numbers are included (e.g., 1, 2, 3, 4, 5, etc.).

The above summary is not intended to describe each disclosed embodiment or every implementation of the present disclosure. The description that follows more particularly exemplifies illustrative embodiments. In several places throughout the application, guidance is provided through lists of examples, which examples can be used individually and in various combinations. In each instance, the recited list serves only as a representative group and should not be interpreted as an exclusive list.

DETAILED DESCRIPTION

The metal surface that may be treated according to the present disclosure may comprise any metal and/or metal alloy that is solid at room temperature. In some embodiments, the metal surface comprises at least one of chromium, chromium alloys, iron, aluminum, copper, nickel, zinc, tin, stainless steel, and brass.

In some embodiments, the metal surface treated as described in the present disclosure comprises a chromated surface such as a chromated steel surface. Chemical conversion coatings (e.g., chromate or phosphate coatings) can be used to improve the corrosion resistance and adhesion capabilities of some metals (e.g., galvanized steel, zinc, and aluminum) Chromating solutions, which are acidic and function by dissolving some of the surface metal of the substrate to be chromated, are specifically designed for the metal to be treated. Chromated surfaces may contain various levels of hexavalent chromium depending on the type of chromating solution.

In some embodiments, the metal surface treated according to the present disclosure comprises at least one of stainless steel or aluminum. The stainless steel that may be treated as described herein includes a variety of grades. For example, the article can have a surface of austenitic, ferritic, or martensitic stainless steel containing at least about 10 (in some embodiments, 11, 12, 13, 14, 15, 16, 17, 18, 19, or 20) percent by weight of chromium. When the chromium content in the stainless steel is at least about 10 percent by weight, the steel can generally readily be formed into a desired shape. Specific types of suitable stainless steels include 430, 304, and 316. Stainless steel generally forms a passivation layer of chromium(III) oxide on its surface. Stainless steel can be resistant to some types of surface treatments that are typically used to improve adhesion such as surface abrasion and is typically not treated with a chemical conversion coating as described above. While adhesion (e.g., of a coating) to some metals is improved by surface abrasion of the metal, stainless steel tends to work-harden under abrasive treatments.

Examples of articles having a metal surface that may be advantageously treated according to the method described herein include kitchen and bathroom faucets, taps, handles, spouts, sinks, drains, hand rails, towel holders, curtain rods, dish washer panels, refrigerator panels, stove tops, stove, oven, and microwave panels, exhaust hoods, grills, automotive wheels or rims, and chemical reactors. Stainless steel articles that are treated according to the present disclosure include those having stainless steel surfaces in a wide range of thicknesses, depending on the application.

Methods for making a treated article according to the present disclosure employ a composition including a secondary or tertiary amino-functional compound having at least two independently selected silane groups in combination with certain fluorinated compounds. In some embodiments, the secondary or tertiary amino-functional compound having at least two independently selected silane groups is used as a primer. The secondary or tertiary amino-functional compound useful for practicing any of these embodiments has at least two independently selected silane groups $Si(Y^2)_p(R^2)_{3-p}$, wherein $Y^2$ is a hydrolysable group such as those described below in connection with formulas I and II or a hydroxyl group, $R^2$ is a non-hydrolysable group such as alkyl or arylalkylenyl, either of which may be substituted, and p is 1, 2, or 3. In the amino-functional compound, the amino group is typically bonded to a carbon atom. The secondary or tertiary amino-functional compound may have one, two, three, or four secondary or tertiary amino groups. The silane groups are independently selected, which means that the two or more silane groups in the amino-functional compound may be the same or different. When the two or more silane groups are independently selected, it should be understood that the $Y^2$ and $R^2$ groups and the number of $Y^2$ groups may be independently selected.

In some embodiments, the secondary or tertiary amino-functional compound useful for practicing the present disclosure is represented by formula I: $(R^3)_2N-R^1-[Si(Y^2)_p(R^2)_{3-p}]_q$. In formulas I, $R^1$ is a multivalent alkylene group optionally interrupted by one or more —O— groups or up to three —NR³— groups. In some embodiments, $R^1$ is interrupted by up to three —O— groups. In embodiments in which $R^1$ is interrupted by up to three —NR³— groups, the secondary or tertiary amino-functional compound includes diamino-functional silanes, triamino-functional silanes, and tetraamino-functional silanes, for example. In some embodiments, $R^1$ is a divalent alkylene group. In some embodiments, $R^1$ is a divalent alkylene group having up to 6 (in some embodiments, 5, 4, or 3) carbon atoms. In some embodiments, $R^1$ is a divalent alkylene group interrupted by one or two —NR³— groups and is represented by formula —CH₂—CH₂—N(R³)—CH₂—CH₂—CH₂— or —CH₂—CH₂—N(R³)—CH₂—CH₂—N(R³)—CH₂—CH₂—CH₂—.

In formula I, $R^2$ is alkyl or arylalkylenyl. In some of these embodiments, $R^2$ is alkyl (e.g., methyl or ethyl).

In formula I, each $R^3$ is independently hydrogen, alkyl, arylalkylenyl, or —R¹—[Si(Y²)_p(R²)_{3-p}], where $R^1$ is defined as in any of the above embodiments, with the proviso that both $R^3$ groups may not be hydrogen. In some embodiments, one $R^3$ group is hydrogen or alkyl, and the other $R^3$ group is —R¹—[Si(Y)_p(R²)_{3-p}]. In some of these embodiments, one $R^3$ group is alkyl, and the other $R^3$ group is —R¹—[Si(Y)_p(R²)_{3-p}]. In some of these embodiments, alkyl may have up to 5, 4, 3, or 2) carbon atoms. In some embodiments, one $R^3$ group is hydrogen or methyl, and the other $R^3$ group is —R¹—[Si(Y)_p(R²)_{3-p}]. In some of these embodiments, one $R^3$ group is hydrogen, and the other $R^3$ group is —R¹—[Si(Y)_p(R²)_{3-p}].

$R^1$ and $R^3$ are selected such that at least two independently selected —Si(Y)_p(R²)_{3-p} groups are present in the compound represented by formula I.

In formula I, $Y^2$ is alkoxy, acyloxy, aryloxy, hydroxyl, polyalkyleneoxy, or halogen. In some embodiments, including any of the embodiments described above for $R^1$, $R^2$, or $R^3$, $Y^2$ is alkoxy, acetoxy, aryloxy, or halogen. In some embodiments, including any of the embodiments described above for $R^1$, $R^2$, or $R^3$, $Y^2$ is methoxy, acetoxy, phenoxy, bromo, or chloro. In some embodiments, including any of the embodiments described above for $R^1$, $R^2$, or $R^3$, $Y^2$ is methoxy, acetoxy, or chloro. Methoxy groups on a silane provide low steric hindrance and are readily hydrolyzed to effectively allow for formation of an —Si—O—Si-bond. Acetoxy and chloro groups on a silane are also readily hydrolyzed for at least the same reason and therefore are expected to be as effective or even more effective than methoxy groups in allowing formation of an —Si—O—Si-bond.

In formula I, p is 1, 2, or 3. In some embodiments, including any of the embodiments described above for $R^1$, $R^2$, $R^3$, or $Y^2$, p is 3.

In formula I, q is 1, 2, or 3. In some embodiments of formula I, q is 1. It should be understood that when q is 1, the compound of formula I can be written as formula II: $(R^3)_2N-R^1-[Si(Y^2)_p(R^2)_{3-p}]$. In these embodiments, $R^1$ is a divalent alkylene group. In some embodiments of formula I, $R^1$ is a multivalent alkylene group, and q is 2 or 3.

Examples of second or tertiary amino-functional compounds useful for practicing the present disclosure include bis(3-trimethoxysilylpropyl)amine, bis(3-triethoxysilylpropyl)amine, N-methyl-bis(3-trimethoxysilylpropyl)amine, and N,N'-bis[3-trimethoxysilylpropyl]-ethylenediamine.

Typically, fluorinated compounds useful for practicing the present disclosure are represented by formula III:

$$Rf\{X-[Si(Y)_{3-x}(R)_x]_y\}_z; \qquad \text{III.}$$

In some embodiments, fluorinated silanes useful in practicing the present disclosure are represented by formula IV:

$$Rf\{Q-X'-[Si(Y)_{3-x}(R)_x]_y\}_z \qquad \text{IV.}$$

In formulas III and IV, Rf is a polyfluoropolyether group, containing two or more in-chain oxygen atoms, and which may be monovalent or divalent. Rf may be linear, branched, cyclic, or a combination thereof, and may be saturated or unsaturated. Rf is typically a perfluorinated group (i.e., all C—H bonds are replaced by C—F bonds). However, hydrogen or chlorine atoms may be present instead of fluorine atoms. Typically, not more than one atom of either hydrogen or chlorine is present for every two carbon atoms. In some embodiments, when hydrogen and/or chlorine are present, Rf includes at least one trifluoromethyl group. Compositions of formula III and IV, being oligomeric or polymeric in nature, typically exist as mixtures and are suitable for use as such.

In formula III, each X is independently a divalent or trivalent organic linking group, which includes linear, branched, and cyclic structures. X may be saturated or unsaturated and can contain 1 to 20 (1 to 15, or 1 to 10) carbon atoms and optionally one or more heteroatoms (e.g., O, N, or S). In some embodiments, X contains up to four heteroatoms. The one or more heteroatoms can be combined into functional groups containing more than one heteroatom (e.g., amides, esters, and carbamates). In some embodiments, X contains at least one functional group (e.g., up to 4 functional groups).

In formula IV, Q is a bond, —C(O)—N(R')—, —C(O)—O—, or —SO$_2$N(R')—. In some embodiments, Q is a bond, —C(O)—N(R')—, or —C(O)—O—. In some embodiments, Q is —C(O)—N(R')—. In any of these embodiments, R' is hydrogen or alkyl having up to 4 carbon atoms (i.e., methyl, ethyl, propyl, or butyl). In some embodiments, R' is hydrogen, methyl, or ethyl. In some embodiments, R' is hydrogen or methyl.

In formula IV, X' is an organic linking group comprising at least one of alkylene or arylalkylene. In some embodiments, X' is alkylene. In some embodiments, X' has up to 10, 8, 6, or 4 carbon atoms. In some embodiments, X' is propylene. X' can be divalent or trivalent and is optionally interrupted by at least one functional group that is independently ether, thioether, sulfone, amine, ester, amide, carbamate, or urea. In some embodiments, X' is optionally interrupted by at least one functional group that is independently ether, ester, carbamate, or amino. The phrase "interrupted by at least one functional group" refers to having alkylene or arylalkylene on either side of the functional group. Representative X' groups that are interrupted by at least one functional group include —(CH$_2$)$_{1-10}$OC(O)N(R)—(CH$_2$)$_{1-10}$—, —(CH$_2$)$_{1-10}$O(CH$_2$)$_{1-10}$S(CH$_2$)$_{1-10}$—, —(CH$_2$)$_{1-10}$OC(O)—(CH$_2$)$_{1-10}$—, —(CH$_2$)$_{1-10}$O(CH$_2$)$_{1-10}$O(CO)N(R')—(CH$_2$)$_{1-10}$, and

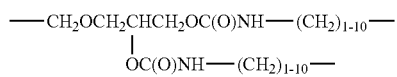

wherein R' is hydrogen or C$_{1-4}$ alkyl.

In some embodiments, Q is —C(O)—N(R')—, and X' is divalent or trivalent alkylene that is optionally interrupted by at least one functional group that is independently ether, ester, carbamate, or amino. In some of these embodiments, X' has up to 8 carbon atoms. In some of these embodiments, X' is

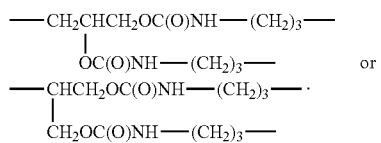

In formulas III and IV, each Y is independently halogen (i.e., fluoride, chloride, bromide, or iodide), alkoxy (i.e., —O-alkyl), acyloxy (i.e., —OC(O)alkyl), polyalkyleneoxy, or aryloxy (i.e., —O-aryl). These Y groups are generally capable of hydrolyzing, for example, in the presence of water to produce silanol groups. Accordingly, at least one Y may also be hydroxyl. In these embodiments, alkyl (e.g., in alkoxy and acyloxy) is optionally substituted with one or more halogen atoms. In some embodiments, alkoxy and acyloxy have up to 8, 6, 4, 3, or 2 carbon atoms. In some embodiments, aryloxy has 6 to 12 (or 6 to 10) carbon atoms and may be unsubstituted or substituted by halogen, alkyl (e.g., having up to 4 carbon atoms), and haloalkyl. Polyalkyleneoxy is, for example, —O—(CH(CH$_3$)—CH$_2$O)$_q$—C$_{1-4}$ alkyl, —O—(CH$_2$—CH$_2$O)$_{q''}$—C$_{1-4}$ alkyl, or a combination thereof (e.g., —O—(CH(CH$_3$)—CH$_2$O)$_{q'}$—(CH$_2$—CH$_2$O)$_{q''}$—C$_{1-4}$ alkyl with a ratio of q' to q'' of 1:1 to 1:10), and q', q'', or q'+q'' is 1 to 40 (in some embodiments, 2 to 10). In some embodiments, each Y is independently selected from the group consisting of halide, hydroxyl, alkoxy, aryloxy, and acyloxy. In some embodiments, each Y is independently selected from the group consisting of halide (e.g., chloride) and alkoxy having up to ten carbon atoms. In some embodiments, each Y is independently alkoxy having from 1 to 6 (e.g., 1 to 4) carbon atoms. In some embodiments, each Y is independently methoxy or ethoxy.

For some embodiments, including any one of the above embodiments of formulas III and IV, Rf comprises perfluorinated repeating units comprising at least one of —(C$_n$F$_{2n}$O)—, —(CF(Z)O)—, —(CF(Z)C$_n$F$_{2n}$O)—, or —(C$_n$F$_{2n}$CF(Z)O)—; wherein Z is a perfluoroalkyl group or a perfluoroalkoxy group, each of which is optionally interrupted by at least one ether linkage, and n is an integer from 1 to 12 (in some embodiments, 1 to 6, 1 to 4, or 1 to 3). In any of these formulas, Z can be linear, branched, or cyclic and can have 1 to 9 carbon atoms and 0 to 4 oxygen atoms. The perfluorinated repeating units may be arranged randomly, in blocks, or in an alternating sequence.

For some embodiments, including any one of the above embodiments, Rf is monovalent, and z is 1. For some of these embodiments, Rf is terminated with a group selected from the group consisting of C$_n$F$_{2n+1}$—, C$_n$F$_{2n+1}$O—, and R'C$_n$F$_{2n}$O— wherein R' is a hydrogen or chlorine atom. For some of these embodiments, the terminal group is C$_n$F$_{2n+1}$— or C$_n$F$_{2n+1}$O—, wherein n is an integer from 1 to 6 or 1 to 3. For some of these embodiments, the approximate average structure of Rf is C$_3$F$_7$O(CF(CF$_3$)CF$_2$O)$_a$CF(CF$_3$)—, C$_3$F$_7$O(CF$_2$CF$_2$CF$_2$O)$_a$CF$_2$CF$_2$—, or CF$_3$O(C$_2$F$_4$O)$_a$CF$_2$—, wherein "a" has an average value of 3 to 50. In some embodiments, Rf is C$_3$F$_7$O(CF(CF$_3$)CF$_2$O)$_a$CF(CF$_3$)—, wherein "a" has an average value of 4 to 7.

For some embodiments, including any one of the above embodiments except where Rf is monovalent, Rf is divalent, and z is 2. For some of these embodiments, Rf is —CF$_2$O(CF$_2$O)$_m$(C$_2$F$_4$O)$_b$CF$_2$—, —CF$_2$O(C$_2$F$_4$O)$_b$CF$_2$—, —(CF$_2$)$_3$O(C$_4$F$_8$O)$_b$(CF$_2$)$_3$—, or —CF(CF$_3$)—(OCF$_2$CF(CF$_3$))$_b$O—Rf'—O(CF(CF$_3$)CF$_2$O)$_b$CF(CF$_3$)—, wherein Rf' is a perfluoroalkylene group optionally interrupted by at least one ether linkage, m is 1 to 50, and b is 3 to 40. For some of these embodiments, Rf' is (C$_d$F$_{2d}$), wherein d is 2 to 4. For some of these embodiments, Rf is —CF$_2$O(CF$_2$O)$_m$(C$_2$F$_4$O)$_b$CF$_2$—, —CF$_2$O(C$_2$F$_4$O)$_b$CF$_2$—, or —CF(CF$_3$)—(OCF$_2$CF(CF$_3$))$_b$O—(C$_d$F$_{2d}$)—O(CF(CF$_3$)CF$_2$O)$_b$CF(CF$_3$)—, and wherein d is 2 to 4, and the average value of m+b or b+b or b is from about 4 to about 24.

The above described fluorinated silanes represented by formulas III and IV typically include a distribution of oligomers and/or polymers, so m and b may be non-integral. The above structures are approximate average structures where the approximate average is over this distribution. These distributions may also contain perfluoropolyethers with no silane groups or more than two silane groups. Typically, distributions containing less than about 10% by weight of compounds without silane groups can be used.

In formulas III and IV, R is an alkyl group having up to 8 carbon atoms (e.g., methyl, ethyl, n-propyl, isopropyl, n-butyl, sec-butyl, tert-butyl, n-pentyl, isopentyl, neopentyl, n-hexyl, n-heptyl, or n-octyl) or a phenyl group. In some embodiments, R is an alkyl group having up to 4 carbon atoms. In some embodiments, R is methyl or ethyl.

In formula III and IV, x is 0, 1, or 2. In some embodiments, including any one of the above embodiments, x is 0 or 1 (in some embodiments, 0).

In formula III and IV, y is a value from 1 to 8. In some embodiments, y is an integer from 1 to 8. In some embodiments, y is 1 or 2. In some embodiments, X' is terminated by an amine or amide group, and y is 2. In some embodiments, X or X' is a branched or tetravalent group, and y is 2. In some embodiments, y is 1.

In some embodiments, the number average molecular weight of the fluorinated compound represented by formula III or IV in any of their aforementioned embodiments is about 750 to about 6000, or about 800 to about 4000.

In some embodiments, including any one of the above embodiments Rf is —$CF_2O(CF_2O)_m(C_2F_4O)_bCF_2$—, z is 2, y is 1, and X—$Si(Y)_{3-x}(Z)_x$ is $C(O)NH(CH_2)_3Si(OCH_3)_3$ or $C(O)NH(CH_2)_3Si(OCH_2CH_3)_3$. For some of these embodiments, m and b are each about 9 to 12. In other embodiments, Rf is $C_3F_7O(CF(CF_3)CF_2O)_aCF(CF_3)$—, z is 1, y is 1, and X—$Si(Y)_{3-x}(Z)_x$ is $C(O)NH(CH_2)_3Si(OCH_3)_3$ or $C(O)NH(CH_2)_3Si(OCH_2CH_3)_3$. In other embodiments, Rf is —$CF(CF_3)$—$(OCF_2CF(CF_3))_bO$—$(C_dF_{2d})$—$O(CF(CF_3)CF_2O)_bCF(CF_3)$—, z is 2, y is 1, and X—$Si(Y)_{3-x}(Z)_x$ is $C(O)NH(CH_2)_3Si(OCH_3)_3$ or $C(O)NH(CH_2)_3Si(OCH_2CH_3)_3$. In yet other embodiments, Rf is $C_3F_7O(CF(CF_3)CF_2O)_aCF(CF_3)$—, z is 1, y is 2, a is as defined above, and X—$[Si(Y)_{3-x}(Z)_x]_y$ is

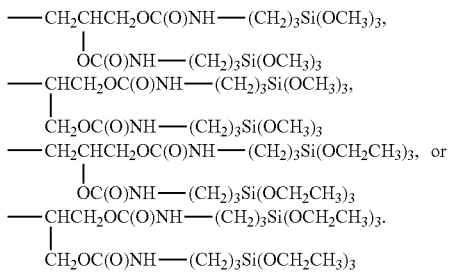

When the secondary or tertiary amino-functional compound is used as a primer, it is believed that the amino group can react with and/or form a chelate with the metal surface. At least some of the hydrolysable Y groups in the $Si(Y)_p(R^2)_{3-p}$ groups are then hydrolyzed to form silanol groups. The water necessary for hydrolysis may be added to the primer composition, may be adventitious water in the solvent or adsorbed to the surface of the substrate, or may be present in the atmosphere to which the secondary or tertiary amino-functional compound is exposed (e.g., an atmosphere having a relative humidity of at least 10%, 20%, 30%, 40%, or even at least 50%). Before the treatment composition is added, the primer composition should be allowed to remain on the metal surface for a sufficient time to allow silanol groups to form. The silanol groups can then react with the hydrolysable groups (e.g., alkoxy, acyloxy, or halogen) on the silane groups of the fluorinated compound to form siloxane bonds. The primer composition should not be allowed to remain on the metal surface for such a length of time that all of the silanol groups react to form siloxane bonds, at which point the primer no longer has reactive groups to react with the silanes on the fluorinated compound. When the secondary or tertiary amino-functional silane is used as a primer, it has been found that one to five hours at room temperature may be a time sufficient to allow silanol groups to form without allowing the detrimental formation of too many siloxane bonds. Also, it has been found that five to 60 minutes at an elevated temperature such as 100° C. to 150° C. may be a time sufficient to allow silanol groups to form without allowing the detrimental formation of too many siloxane bonds.

In embodiments of a treated article according to the present disclosure made from the method in which the secondary or tertiary amino-functional compound is used as a primer, at least a portion of the metal surface is in contact, bonded to, or chelated with a secondary or tertiary amino-functional compound. The secondary or tertiary amino-functional compound forms a layer on at least a portion of the metal surface, and the formed layer typically includes at least one siloxane bond shared with the fluorinated compound. All the silanes in the secondary or tertiary amino-functional compound may be converted to siloxanes, either by condensation with the fluorinated compound or by self-condensation, or some unreacted silanes or uncondensed silanols may remain on the secondary or tertiary amino-functional compound. When the fluorinated compound is bonded to the secondary or tertiary amino-functional compound, the fluorinated compound may be represented by formula $Rf\{$—X—$[Si(Y')_{3-x}(R)_x]_y\}_z$, in which Rf, X, R, x, y, and z are as defined above in any of their embodiments described above in connection with Formulas III and IV. Each Y' is independently halogen, alkoxy, hydroxyl, acyloxy, polyalkyleneoxy, or acyloxy as defined in any of their embodiments described above in connection with the definition of Y. In the treated article, Y' may also be —O-bonded to the secondary or tertiary amino-functional compound, forming the at least one siloxane. In some of these embodiments, the bond may be a covalent bond or hydrogen bond, for example. All the silanes in the fluorinated compound may be converted to siloxanes, either by condensation with the secondary or tertiary amino-functional compound or by self-condensation, or some unreacted silanes or uncondensed silanols may remain on the fluorinated compound. Thus, in some embodiments of the treated article according to the present disclosure, the layer on the metal surface is a partial condensate of the secondary or tertiary amino-functional compound and the fluorinated compound.

In embodiments of a treated article according to the present disclosure made from the method in which the secondary or tertiary amino-functional compound is used as a primer, it is typically possible to analyze the treated article to find a layer rich in the secondary or tertiary amino-functional compound and a layer rich in the fluorinated compounds, for example, using ESCA or other analytical techniques.

In some embodiments, the method according to the present disclosure includes treating the metal surface with a treatment composition including both secondary or tertiary amino-functional compound having at least two independently selected silane groups and a fluorinated compound. In these embodiments, the fluorinated compound is represented by formula $Rf\{C(O)NR'$—X"—$[Si(Y)_{3-x}(R)_x]_y\}_z$, in which Rf, R', R, Y, x, y, and z are as defined above in connection with Formulas III and IV in any of their embodiments. In these embodiments, X" is a divalent or trivalent organic linking group comprising at least one of alkylene or arylalkylene, each of which is optionally interrupted by at least one carbamate or urea. In some embodiments, X" has up to 10, 8, 6, or 4 carbon atoms. In some embodiments, alkylene or arylalkylene is interrupted by at least one carbamate or urea, in some embodiments, a carbamate. In some of these embodiments, X" is

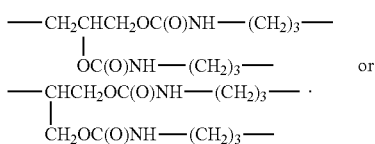

As in the method described above in which the secondary or tertiary amino-functional compound is used as a primer, the water necessary for hydrolysis made be added to the treatment composition, may be adventitious water in the solvent or adsorbed to the surface of the substrate, or may be present in the atmosphere to which the secondary or tertiary amino-functional compound and the fluorinated compound are exposed. In a treated article prepared by this method, there is a layer formed on at least a portion of a metal surface. The layer includes a siloxane that includes a reaction product of the secondary or tertiary amino-functional compound having at least two independently selected silane groups and a fluorinated compound that is represented by formula Rf{C(O)NR'—X"—[Si(Y$^1$)$_{3-x}$(R)$_x$]$_y$}$_z$. In this formula each Y$^1$ is independently halogen, alkoxy, hydroxyl, acyloxy, polyalkyleneoxy, or aryloxy as defined in any of their embodiments described above in connection with the definition of Y. In the layer formed on the treated article, Y' may also be —O-bonded to the secondary or tertiary amino-functional compound, forming at least one siloxane bond, or —O-bonded to the metal surface. In some of these embodiments, the bond may be a covalent bond or hydrogen bond, for example. Rf, X", R, x, y, and z are as defined above in any of their embodiments. Again, in some embodiments of the treated article according to the present disclosure, the layer formed on the metal surface is a partial condensate of the secondary or tertiary amino-functional compound and the fluorinated compound.

The fluorinated compounds represented by formulas III and IV can be synthesized, for example, from a fluorinated carboxylic acid or salt thereof, an acid fluoride thereof, or a fluorinated carboxylic acid ester (e.g., Rf—[C(O)—OCH$_3$]$_z$) using a variety of conventional techniques. For example, a fluorinated methyl ester can be treated with an amine having formula NH$_2$—X—Si(Y)$_{3-x}$(Z)$_x$ according to the following reaction sequence:

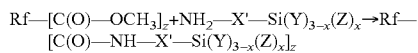

In this sequence, Rf, X', Y, Z, x, and z are as defined in any of the above embodiments. Some amines having formula NH$_2$—X—Si(Y)$_{3-x}$(Z)$_x$ are commercially available (e.g., (3-aminopropyl)trimethoxysilane and (3-aminopropyl)triethoxysilane). The reaction may be carried out, for example, at an elevated temperature (e.g., up to 80° C., 70° C., 60° C., or 50° C.), and may be carried out neat or in a suitable solvent. Conditions for carrying out these transformations are known in the art; see, e.g., U.S. Pat. No. 3,810,874 (Mitsch et al.) and U.S. Pat. No. 3,646,085 (Bartlett), the disclosures of which, relating to the preparation of fluorinated silanes, are incorporated herein by reference.

Some fluorinated methyl esters are commercially available (e.g., CH$_3$OC(O)CF$_2$(OCF$_2$CF$_2$)$_{9-10}$CF$_2$C(O)OCH$_3$, a perfluoropolyether diester available from Solvay Solexis, Houston, Tex., under the trade designation "FOMBLIN ZDEAL"). Others can be prepared, for example, through direct fluorination of a hydrocarbon polyether diester using techniques known in the art; see, e.g., methods disclosed in U.S. Pat. No. 5,578,278 (Fall et al.) and U.S. Pat. No. 5,658,962 (Moore et al.). In some embodiments, a fluorinated methyl ester is prepared by oligomerization of hexafluoropropylene oxide (HFPO) and functionalization of the resulting perfluoropolyether carbonyl fluoride according to the methods described in U.S. Pat. No. 4,647,413 (Savu), the disclosure of which is incorporated herein by reference.

Fluorinated compounds represented by formulas III and IV can also be prepared, for example, by reaction of a carboxylic acid ester (e.g., Rf—[C(O)—OCH$_3$]$_z$) with an amino alcohol having formula NH$_2$—X$^1$—OH (e.g., ethanolamine or 3-amino-1,2-propanediol) to prepare fluorinated hydroxyl compound Rf—[(CO)NHX$^1$OH]$_z$ as shown in the following reaction sequence, wherein Rf is as defined in any of the above embodiments, and X$^1$ is a precursor to X', wherein X' is interrupted by at least one ether, ester, or carbamate group.

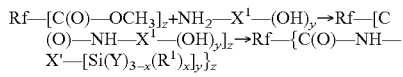

The conditions for the reaction with NH$_2$—X'—Si(Y)$_{3-x}$(Z)$_x$, described above, can be used for the reaction with NH$_2$—X$^1$—OH. The fluorinated hydroxyl compound can then be treated with, for example, a haloalkyl silane (e.g., chloropropyltrimethoxysilane) or an isocyanatoalkyl silane (e.g., 3-isocyanatopropyltriethoxysilane). The reaction with a haloalkyl silane can be carried out, for example, by first treating the fluorinated hydroxyl compound with a base (e.g., sodium methoxide or sodium tert-butoxide) in a suitable solvent (e.g., methanol), optionally at an elevated temperature (e.g., up to the reflux temperature of the solvent), followed by heating (e.g., at up to 100° C., 80° C., or 70° C.) the resulting alkoxide with the haloalkyl silane. The reaction of a fluorinated hydroxyl compound represented by formula Rf—[C(O)—NH—X$^1$—(OH)$_y$]$_z$ with an isocyanatoalkyl silane can optionally be carried out in a suitable solvent (e.g., methyl ethyl ketone), optionally at an elevated temperature (e.g., the reflux temperature of the solvent), and optionally in the presence of a catalyst (e.g., stannous octanoate).

Fluorinated compounds represented by formulas III and IV can also be prepared, for example, by reducing an ester of formula Rf—[C(O)—OCH$_3$]$_z$ or a carboxylic acid of formula Rf—[C(O)—OH]$_z$ using conventional methods (e.g., hydride, such as sodium borohydride, reduction) to a fluorinated hydroxyl compound of formula Rf—[CH$_2$OH]$_z$ as shown in the following reaction sequence, wherein Rf, X, Y, Z, x, and z are as defined in any of the above embodiments, and X is interrupted by at least one ether, ester, or carbamate group.

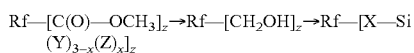

The fluorinated hydroxyl compound of formula Rf—[CH$_2$OH]$_z$ can then be converted, for example, to a silane by reaction with a haloalkyl silane or isocyanatoalkyl silane using the techniques described above. Some useful fluorinated hydroxyl compounds are commercially available (e.g., HOCH$_2$CF$_2$(OCF$_2$CF$_2$)$_{9-10}$(OCF$_2$)$_{9-10}$CF$_2$CH$_2$OH, a perfluoropolyether diol available from Solvay Solexis available under the trade designation "FOMBLIN ZDOL").

Fluorinated hydroxyl compounds can also be treated, for example, with allyl halides (e.g., allyl chloride, allyl bromide, or allyl iodide) under the conditions described above for the reaction of fluorinated hydroxyl compounds with haloalkyl silanes. The resulting allyl-substituted compounds can be treated with, for example, a commercially available, or readily synthesized, mercaptosilane of the formula HS—X'—Si(Y)$_{3-x}$(Z)$_x$, wherein X', Y, Z, and x can be defined as in any of the above embodiments, under free radical conditions. Useful free radical initiators include hydrogen peroxide, potassium persulfate, t-butyl hydroperoxide, benzoyl peroxide, t-butyl perbenzoate, cumene hydroperoxide, 2,2'-azobis(2-methylbutyronitrile), azobis (isobutyronitrile) (AIBN), and free radical photoinitiators such as those described by K. K. Dietliker in Chemistry & Technology of UV & EB Formulation for Coatings, Inks & Paints, Volume 3, pages 276-298, SITA Technology Ltd., London (1991). Conditions for carrying out this transformation are known in the art; see, e.g., U.S. Pat. No. 7,294,731 (Flynn et al.), the disclosure of which, relating to the preparation of fluorinated silanes, is incorporated herein by reference.

Fluorinated hydroxyl compounds can also be treated, for example, with acryloyl halides, esters, anhydrides or acrylic acid to produce fluorinated acrylate esters, which can then be treated, for example, with amines having formula NH$_{(3-y)}$—[X'—Si(Y)$_{3-x}$(Z)$_x$]$_y$, wherein X', Y, Z, x, and y can be defined as in any of the above embodiments, according to the methods described in U.S. Pat. Appl. No. 2008/0220264 (Iyer et al.), the disclosure of which, relating to the preparation of fluorinated silanes, is incorporated herein by reference. The reaction between fluorinated acrylate esters and amines are optionally carried out in dry solvent and optionally in the presence of 0.05 percent to 2 percent by weight catalyst (e.g., a base such as 1,4-dihydropyridines, methyl diphenylphosphane, methyl di-p-tolylphosphane, 2-allyl-N-alkyl imidazolines, tetra-t-butylammonium hydroxide, DBU (1,8-diazabicyclo[5.4.0]undec-7-ene), tetramethylguanidine, DBN (1,5-diazabicyclo[4.3.0]non-5-ene), potassium methoxide, sodium methoxide, or sodium hydroxide). Conveniently, progress of the reaction can be determined using infrared spectroscopy. Fluorinated acrylate esters can also be treated with mercaptosilanes represented by formula HS—X—Si(Y)$_{3-x}$(Z)$_x$, under similar conditions.

Further details about the preparation of fluorinated compounds useful for practicing the present disclosure can be found in the Examples, below, and references cited therein.

As shown in the Examples, below, secondary or tertiary amino-functional compounds having at least two independently selected silane groups are surprisingly more effective primers than compounds of formula L-X$^2$Si(Y)$_3$ or M(Y)$_4$, in which L is an amino group (e.g., primary amino group); X$^2$ is alkylene (e.g., having up to 8, 6, or 4 carbon atoms) optionally interrupted by at least one ether linkage (e.g., propylene); M is Si, Ti, or Zr (e.g., Si); and each Y is independently as defined in any of the embodiments for formula III or IV above (e.g., methoxy or ethoxy). In some embodiments, primer compositions and/or treatment compositions useful for practicing the present disclosure are free of any or all of the compounds represented by formula L-X$^2$Si(Y)$_3$, M(Y)$_4$, as defined above, and (R$^4$)$_g$Si(Y)$_{4-g}$, wherein R$^4$ is independently an alkyl group having up to 8 (in some embodiments, up to 6 or 4) carbon atoms or a phenyl group, each of which may be substituted by halogen (i.e., fluoride, chloride, bromide, or iodide), g is 1 or 2, and wherein Y is as defined above. As shown in the Examples, below, methods according to the present disclosure effectively provide an easy-to-clean coating in the absence of these compounds.

A primer composition useful for practicing the present disclosure typically includes from at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, or 0.5 percent by weight, up to 1, 1.5, or 2 percent by weight of at least one secondary or tertiary amino-functional compound, based on the total weight of the primer composition. For example, the amount of a secondary or tertiary amino-functional compound in a primer composition may be in a range of from 0.01 to 2, 0.01 to 1, 0.05 to 2, 0.05 to 1, or from 0.1 to 1 percent by weight, based on the total weight of the primer composition. Lower or higher amounts of the secondary or tertiary amino-functional compound may also be useful, and may be desirable for some applications.

A treatment composition useful for practicing the present disclosure typically includes from at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, or 0.5 percent by weight, up to 1, 1.5, or 2 percent by weight of at least one fluorinated compound represented by formula III or IV, based on the total weight of the treatment composition. For example, the amount of a fluorinated compound represented by formula III or IV in a treatment composition may be in a range of from 0.01 to 2, 0.01 to 1, 0.05 to 2, 0.05 to 1, or from 0.1 to 1 percent by weight, based on the total weight of the treatment composition. Lower or higher amounts of the fluorinated compound may also be useful, and may be desirable for some applications.

Some embodiments of the treatment composition useful for practicing the present disclosure can also include from at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, or 0.5 percent by weight, up to 1, 1.5, or 2 percent by weight of at least one secondary or tertiary amino-functional compound, based on the total weight of the treatment composition, in addition to the fluorinated compound. For example, the amount of a secondary or tertiary amino-functional compound in a treatment composition may be in a range of from 0.01 to 2, 0.01 to 1, 0.05 to 2, 0.05 to 1, or from 0.1 to 1 percent by weight, based on the total weight of the treatment composition. Lower or higher amounts of the secondary or tertiary amino-functional compound may also be useful, and may be desirable for some applications.

In some embodiments, primer compositions and/or treatment compositions useful for practicing the present disclosure comprise acid. In some embodiments, the acid comprises at least one of (i.e., comprises one or more of) acetic acid, citric acid, formic acid, triflic acid, perfluorobutyric acid, sulfuric acid, or hydrochloric acid. In some embodiments, the acid is hydrochloric acid. Stronger acids typically effect the hydrolysis of silane groups at a lower temperature than weaker acids and are therefore sometimes desirable. The acid may be present in the primer and/or treatment composition in a range, for example, from about 0.004, 0.007, 0.01, or 0.015 percent by weight to about 1, 1.5, 2, 2.5, or 3 percent by weight, based on the total weight of the primer or treatment composition. In some embodiments, the acid is present in an amount up to 0.5, 0.4, 0.3, 0.2, or 0.1 percent by weight based on the total weight of the primer or treatment composition. In some embodiments, the acid is hydrochloric acid and is present in the primer composition or treatment composition in a range from 0.004 to 0.05 percent by weight, based on the total weight of the primer composition or treatment composition. Under neutral pH conditions, the condensation of silanol groups may be carried out at elevated temperature (e.g., in a range from 40° C. to 200° C. or even 50° C. to 100° C.) although the reaction can also proceed at room temperature. Under acidic conditions, the condensation of silanol groups may be carried out at room temperature (e.g., in a range from about 15° C. to about 30° C. or even 20° C. to 25° C.) as well as at an elevated temperature (e.g., in a range from 40° C. to 200° C. or even 50° C. to 100° C.). The rate of the condensation reaction is typically dependent upon temperature and the concentration of fluorinated compound (e.g., in a treatment composition containing the fluorinated compound).

In some embodiments, primer compositions and/or treatment compositions useful for practicing the present disclosure comprise water. In some embodiments, the water is present in the primer composition or treatment composition in a range from 0.01 percent to 5 percent (in some embodiments, 0.05 to 1, 0.05 to 0.5, or 0.1 to 0.5 percent) by weight, based on the total weight of the primer composition or treatment composition. Water may be added to the primer and/or treatment composition separately or may be added as part of an aqueous acidic solution (e.g., concentrated hydrochloric acid is 37% by weight of the acid in water).

Typically, treatment compositions useful in practicing the present disclosure include organic solvent. As used herein, the term "organic solvent" includes a single organic solvent and a mixture of two or more organic solvents. Useful organic solvents are typically capable of dissolving at least about 0.01 percent by weight of a fluorinated silane represented by formula III or IV in the presence of at least 0.01 (e.g., 0.1) percent by weight water and at least 0.004 (e.g., 0.01) percent by weight acid.

Suitable organic solvents include aliphatic alcohols (e.g., methanol, ethanol, and isopropanol); ketones (e.g., acetone, 2-butanone, and 2-methyl-4-pentanone); esters (e.g., ethyl acetate, butyl acetate, and methyl formate); ethers (e.g., diethyl ether, diisopropyl ether, methyl t-butyl ether, 2-methoxypropanol, and dipropyleneglycol monomethylether (DPM)); hydrocarbons such as alkanes (e.g., heptane, decane, and paraffinic solvents); and fluorinated solvents such as partially or fully fluorinated hydrocarbons (e.g., perfluorohexane, perfluorooctane, and pentafluorobutane) and hydrofluoroethers (e.g., methyl perfluorobutyl ether and ethyl perfluorobutyl ether) and those obtained from 3M Company, St. Paul, Minn., under the trade designation "NOVEC 7100" or "NOVEC 7200". In some embodiments, the organic solvent is methanol, ethanol, isopropanol, or a mixture thereof. In some embodiments, the organic solvent is isopropanol.

The ratio of the organic solvent, water, acid, fluorinated compound, and any other components may be chosen to provide a homogeneous treatment composition. In these embodiments, the treatment composition is used with a primer. In some embodiments of the treatment composition, the ratio of the organic solvent, water, acid, fluorinated compound, secondary or tertiary amino-functional compounds, and any other components may be chosen to provide a homogeneous treatment composition. In the primer composition, the ratio of the organic solvent, secondary or tertiary amino-functional compound, and any other components may be chosen to provide a homogeneous primer composition.

Treatment compositions useful in practicing the present disclosure may be applied to a metal surface either shortly after their preparation (e.g., up to one hour), or after standing at room temperature for a period of time (e.g., more than 1 hour, 3 to 8 hours, several days, or several weeks). Hydrolysis and condensation of the fluorinated silanes may be more likely to occur after compositions are exposed to time and temperature.

Treatment compositions useful for practicing the present disclosure may be prepared from a concentrate (e.g., a concentrated solution of a fluorinated compound represented by formula III or IV in organic solvent). The concentrate may be stable for several weeks (e.g., at least one, two, or three months) and may comprise the fluorinated compound in an amount of at least 10, 20, 25, 30, or at least 40 percent by weight, based on the total weight of the concentrate. Concentrates may be diluted shortly before use, for example, with water, organic solvent, acid, and optionally additional fluorinated compound or other silanes.

In some embodiments, the surface of the metal surface to be treated may be cleaned before treatment. It is typically desirable to remove foreign materials such as dust, oil, grease, and other contamination. Cleaning may be carried out, for example, with an organic solvent (e.g., a ketone such as acetone or an alcohol such as isopropanol), with water, with a solution of sodium hydroxide (e.g., 2, 5, or 10 percent by weight aqueous sodium hydroxide), or with a combination thereof. The cleaning may be carried out at room temperature or at an elevated temperature (e.g., in a range from about 50° C. to about 100° C.). Techniques for cleaning a metal surface include wiping, rinsing, and sonicating. After cleaning, the metal surface of the substrate may be dried, for example, under a stream of air or nitrogen or at an elevated temperature.

A wide variety of methods can be used to treat a metal surface with a treatment composition and, in some embodiments, a primer composition disclosed herein (e.g., brushing, spraying, dipping, rolling, spreading, or chemical vapor deposition). A metal surface can typically be treated with a treatment and/or primer composition at room temperature (typically, about 15° C. to about 30° C. or about 20° C. to about 25° C.). Or the treatment and/or primer composition can be applied to surfaces that are preheated (e.g., at a temperature of 60° C. to 150° C.). Following application, the treated article can be dried and cured at ambient or elevated temperature (e.g., at 40° C. to 300° C., 50° C. to 150° C., or 75° C. to 140° C.) and for a time sufficient to dry. In some embodiments, repellent and durable surface treatments according to the present disclosure can be obtained upon treating an article and drying at ambient temperature. Easy-to-clean articles prepared according to the present disclosure wherein the treatment composition is dried typically no longer have organic solvent or water present on the surface.

In some embodiments, including any one of the above embodiments, the method of making an easy-to-clean article having a metal surface further comprises subjecting at least the surface to an elevated temperature after treating the metal surface with the treatment composition.

In some embodiments, including any one of the above embodiments of the treated article, the thickness of the treatment is less than 1 micrometer, typically less than 500 nanometeres. In some embodiments, the thickness of the treatment is at least about 10, 20, 30, or 50 nanometers, up to about 100, 150, or 200 nanometers. Thin coatings made according to the methods disclosed herein typically and advantageously are transparent and do not change the visual appearance, thermal conductivity, or mechanical properties of the metal surface.

The easy-to-clean performance of the articles and methods disclosed herein is typically measured by evaluating contact angles of at least one of water or hydrocarbon (e.g., hexadecane) on the treated surface. In this application, water contact angles are measured at room temperature (e.g., about 25° C. to 30° C.) using equipment obtained from Kruss GmbH, Hamburg, Germany, and are usually measured four times to obtain an average measurement. In some embodiments of the methods and articles disclosed herein, the treated metal surface has an initial static contact angle versus water of at least 90 (in some embodiments, at least 95, 97, 98, 100, 105, or 110) degrees. In these embodiments, "initial" refers to contact angles measured for the treated metal surface about 24 hours after treating the surface and before any abrading or wiping of the treated metal surface.

Metal surfaces treated according to the present disclosure typically provide durable easy-to-clean performance (i.e., the easy-to-clean performance is maintained after cleaning the surface several times). In this application, durability is measured by measuring contact angles versus water of a treated metal plate before and after being subjected to rubbing or abrasion. Rubbing is carried out by rubbing a treated substrate with a paper towel for ten seconds. Abrasion is carried out by abrading the treated substrates on an abrasion tester (obtained from Erichsen GmbH & Co. KG, Hemer, Germany) and scrubbing for 1000 cycles with the yellow side of a sponge obtained from 3M Company, St. Paul, Minn. under the trade designation "SCOTCHBRITE", which is water-wet. In some embodiments of the methods and articles disclosed herein, the treated metal surface has a static contact angle versus water of at least 85 (in some embodiments, at least 90, 95, 100, or 105) degrees after rubbing for ten seconds. In some embodiments of the methods and articles disclosed herein, the treated metal surface has a static contact angle versus water of at least 85 (in some embodiments, at least 90, 95, 100, or 105) degrees after 1000 cycles of abrasion as described above.

The easy-to-clean performance of the articles and methods disclosed herein is also measured by visually evaluating how a permanent marker wets out the treated surface (stain repellency), how easily the marker can be removed from the surface (ease of stain removal), and whether the mark remains on the surface (stain resistance). The durability of this easy-to-clean performance is measured before and after rubbing or abrasion.

After rubbing or abrasion, the method according to the present disclosure provides treated substrates with at least one of surprisingly higher contact angles, surprisingly better stain repellency, surprisingly easier stain removal, or surprisingly better stain resistance than a comparable method using an equivalent surface, but using a primary amino-functional silane as a primer instead of the secondary or tertiary amino-functional silane. For example, after rubbing when aminopropyltrimethoxysilane was used as a primer instead of bis(trimethoxysilylpropyl)amine, contact angles were approximately 20 degrees lower, the marker did not bead up on the surface, and the marker stained remained on the surface. In fact, the performance of the treated surface was about the same when aminopropyltrimethoxysilane was used as a primer as when no primer was used at all. The term "equivalent surface" refers to a metal surface that is similar to or the same (e.g., in grade, surface preparation, and surface composition) as a metal surface disclosed herein before it is treated according to the present disclosure.

Similarly, the method according to the present disclosure provides treated substrates with at least one of surprisingly higher contact angles, surprisingly better stain repellency, surprisingly easier stain removal, or surprisingly better stain resistance than a comparable method using an equivalent surface, but using a primary amino-functional silane in combination with a fluorinated compound instead of the secondary or tertiary amino-functional silane in combination with the fluorinated compound. For example, before abrasion when aminopropyltrimethoxysilane was used with a fluorinated silane instead of bis(trimethoxysilylpropyl)amine, contact angles were approximately 40 to 50 degrees lower, and the marker did not bead up on the surface. After abrasion, coatings made from the combination of the fluorinated silane and bis(trimethoxysilylpropyl)amine also had surprisingly higher contact angles, stain removal capability, and stain resistance. The term "equivalent surface" refers to a metal surface that is similar to or the same (e.g., in grade, surface preparation, and surface composition) as a metal surface disclosed herein before it is treated according to the present disclosure.

SOME EMBODIMENTS OF THE DISCLOSURE

In a first embodiment, the present disclosure provides a method of making a treated article having a metal surface, the method comprising:

treating the metal surface with a primer composition comprising a secondary or tertiary amino-functional compound having at least two independently selected silane groups to provide a primed metal surface; and subsequently treating the primed metal surface with a treatment composition comprising a fluorinated compound represented by formula:

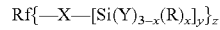

wherein:
Rf is a polyfluoropolyether group;
X is a divalent or trivalent organic linking group;
each Y is independently halogen, alkoxy, hydroxyl, acyloxy, polyalkyleneoxy, or aryloxy;
R is an alkyl group having up to 8 carbon atoms or a phenyl group;
x is 0 or 1 or 2;
y is a value from 1 to 8; and
z is 1 or 2.

In a second embodiment, the present disclosure provides the method of the first embodiment, wherein the fluorinated compound is represented by formula Rf{Q-X'—[Si(Y)$_{3-x}$(R)$_x$]$_y$}$_z$, wherein
Q is a bond, —C(O)—N(R')—, —C(O)—O—, or —SO$_2$N(R')—, wherein R' is hydrogen or alkyl having up to 4 carbon atoms; and X' is a divalent or trivalent organic linking group comprising at least one of alkylene or arylalkylene, each of which is optionally interrupted by at least one functional group that is independently ether, thioether, sulfone, amine, ester, amide, carbamate, or urea.

In a third embodiment, the present disclosure provides the method of the second embodiment, wherein Q is —C(O)—N(R')—, wherein X' is divalent or trivalent alkylene that is optionally interrupted by at least one functional group that is independently ether, ester, carbamate, or amino.

In a fourth embodiment, the present disclosure provides the method of the third embodiment, wherein X' is

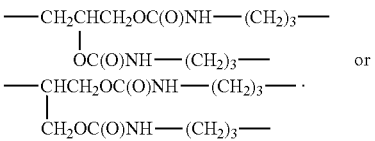

In a fifth embodiment, the present disclosure provides a method of making a treated article having a metal surface, the method comprising treating the metal surface with a treatment composition comprising:

a secondary or tertiary amino-functional compound having at least two independently selected silane groups; and a fluorinated compound represented by formula:

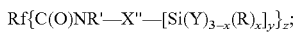

wherein:
Rf is a polyfluoropolyether group;
X" is a divalent or trivalent organic linking group comprising at least one of alkylene or arylalkylene, each of which is optionally interrupted by at least one carbamate or urea;
each Y is independently halogen, alkoxy, hydroxyl, acyloxy, polyalkyleneoxy, or aryloxy;
R is an alkyl group having up to 8 carbon atoms or a phenyl group;
R' is hydrogen or alkyl having up to 4 carbon atoms;
x is 0 or 1 or 2;
y is a value from 1 to 8; and
z is 1 or 2.

In a sixth embodiment, the present disclosure provides the method of the fifth embodiment, wherein the secondary or tertiary amino-functional compound is present in the treatment composition in a range from 0.01 percent to 2 percent by weight, based on the total weight of the treatment composition.

In a seventh embodiment, the present disclosure provides the method of any one of the first to sixth embodiments, wherein the secondary or tertiary amino-functional compound is represented by formula

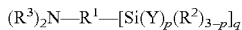

wherein
$R^1$ is a multivalent alkylene group optionally interrupted by one or more —O— groups or up to three —$NR^3$— groups;
$R^2$ is alkyl or arylalkylenyl;
each $R^3$ is independently hydrogen, alkyl, arylalkylenyl, or —$R^1$—[Si(Y)$_p$($R^2$)$_{3-p}$];
Y is alkoxy, acyloxy, aryloxy, polyalkyleneoxy, halogen, or hydroxyl;
p is 1, 2, or 3; and
q is 1, 2, or 3,
with the provisos that at least two independently selected —Si(Y)$_p$($R^2$)$_{3-p}$ groups are present and that both $R^3$ groups may not be hydrogen.

In an eighth embodiment, the present disclosure provides the method of the seventh embodiment, wherein one $R^3$ is alkyl or hydrogen, and the other $R^3$ is —$R^1$—[Si(Y)$_p$($R^2$)$_{3-p}$].

In a ninth embodiment, the present disclosure provides the method of any one of the first to eighth embodiments, wherein the secondary or tertiary amino-functional compound is bis(3-trimethoxysilylpropyl)amine, N-methyl-bis(3-trimethoxysilylpropyl)amine, or N,N'-bis[3-trimethoxysilylpropyl]-ethylenediamine.

In a tenth embodiment, the present disclosure provides the method of the seventh or eighth embodiment, wherein in the at least two independently selected silane groups, Y is methoxy, acetoxy, or chloro, and p is 3.

In an eleventh embodiment, the present disclosure provides the method of any one of the first to tenth embodiments, wherein Rf comprises perfluorinated repeating units comprising at least one of —($C_nF_{2n}$O)—, —(CF(Z)O)—, —(CF(Z)$C_nF_{2n}$O)—, or —($C_nF_{2n}$CF(Z)O)—; and wherein Z is a perfluoroalkyl group or a perfluoroalkoxy group, each of which is optionally interrupted by at least one ether linkage, and n is an integer from 1 to 12.

In a twelfth embodiment, the present disclosure provides the method of the eleventh embodiment, wherein z is 2, and Rf is —$CF_2O(CF_2O)_m(C_2F_4O)_bCF_2$—, —$CF_2O(C_2F_4O)_bCF_2$—, —$(CF_2)_3O(C_4F_8O)_b(CF_2)_3$—, or —CF(CF_3)—(OCF_2CF(CF_3))_bO—Rf'—O(CF(CF_3)CF_2O)_bCF(CF_3)—, and wherein Rf' is a perfluoroalkylene group optionally interrupted by at least one ether linkage, m is 1 to 50, and b is 3 to 40.

In a thirteenth embodiment, the present disclosure provides the method of any one of the first to eleventh embodiments, wherein Rf is $C_3F_7O(CF(CF_3)CF_2O)_aCF(CF_3)$—, $C_3F_7O(CF_2CF_2CF_2O)_aCF_2CF_2$—, or $CF_3O(C_2F_4O)_aCF_2$—, wherein a has an average value of 3 to 50, and wherein z is 1.

In a fourteenth embodiment, the present disclosure provides the method of any one of the first to thirteenth embodiments, wherein the fluorinated compound is present in the treatment composition in a range from 0.01 percent to 2 percent by weight, based on the total weight of the treatment composition.

In a fifteenth embodiment, the present disclosure provides the method of any one of the first to fourteenth embodiments, wherein the treatment composition further comprises an organic solvent.

In a sixteenth embodiment, the present disclosure provides the method of any one of the first to fifteenth embodiments, wherein the treatment composition further comprises an acid catalyst.

In a seventeenth embodiment, the present disclosure provides the method of any one of the first to sixteenth embodiments, wherein the metal substrate comprises at least one of chromium, a chromium alloy, iron, aluminum, copper, nickel, zinc, tin, stainless steel, or brass.

In an eighteenth embodiment, the present disclosure provides a treated article comprising a metal surface, wherein a layer is formed on at least a portion of the metal surface, wherein the layer comprises a secondary or tertiary amino-functional compound including at least one siloxane and at least one other group selected from the group consisting of siloxane, silanol, and silane; and
a fluorinated compound bonded to the secondary or tertiary amino-functional compound, wherein the fluorinated compound is represented by formula:

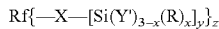

wherein:
Rf is a polyfluoropolyether group;
X is a divalent or trivalent organic linking group;
each Y' is independently halogen, alkoxy, hydroxyl, acyloxy, polyalkyleneoxy, aryloxy, or —O-bonded to the secondary or tertiary amino-functional compound, forming the at least one siloxane;
R is an alkyl group having up to 8 carbon atoms or a phenyl group;
x is 0 or 1 or 2;
y is a value from 1 to 8; and
z is 1 or 2.

In a nineteenth embodiment, the present disclosure provides the treated article of the eighteenth embodiment, wherein the fluorinated compound is represented by formula Rf{Q-X'—[Si(Y')$_{3-x}$(R)$_x$]$_y$}$_z$, wherein Q is a bond, —C(O)—N(R')—, —C(O)—O—, or —SO$_2$N(R')—, wherein R' is hydrogen or alkyl having up to 4 carbon atoms; and
X' is a divalent or trivalent organic linking group comprising at least one of alkylene or arylalkylene, each of which is optionally interrupted by at least one functional group that is independently ether, thioether, sulfone, amine, ester, amide, carbamate, or urea.

In a twentieth embodiment, the present disclosure provides the treated article of the nineteenth embodiment, wherein Q is —C(O)—N(R')—, wherein X' is divalent or trivalent alkylene that is optionally interrupted by at least one functional group that is independently ether, ester, carbamate, or amino.

In a twenty-first embodiment, the present disclosure provides the treated article of the twentieth embodiment, wherein X' is

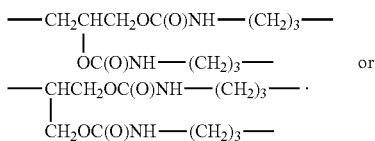

In a twenty-second embodiment, the present disclosure provides a treated article comprising a metal surface, wherein a layer is formed on at least a portion of the metal surface, the layer comprising a siloxane reaction product of a secondary or tertiary amino-functional compound having at least two independently selected silane groups and a fluorinated compound, wherein the fluorinated compound is represented by formula:

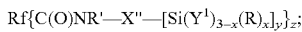

wherein:
Rf is a polyfluoropolyether group;
X" is a divalent or trivalent organic linking group comprising at least one of alkylene or arylalkylene, each of which is optionally interrupted by at least one carbamate or urea;
each Y' is independently halogen, alkoxy, hydroxyl, acyloxy, polyalkyleneoxy, aryloxy, —O-bonded to the secondary or tertiary amino-functional compound, forming at least one siloxane bond, or —O-bonded to the metal surface;
R is an alkyl group having up to 8 carbon atoms or a phenyl group;
R' is hydrogen or alkyl having up to 4 carbon atoms;
x is 0 or 1 or 2;
y is a value from 1 to 8; and
z is 1 or 2.

In a twenty-third embodiment, the present disclosure provides the treated article of any one of eighteenth to twenty-second embodiments, wherein the secondary or tertiary amino-functional compound is represented by formula

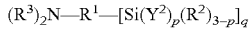

wherein
$R^1$ is a multivalent alkylene group optionally interrupted by one or more —O— groups or up to three —$NR^3$— groups;
$R^2$ is alkyl or arylalkylenyl;
each $R^3$ is independently hydrogen, alkyl, arylalkylenyl, or —$R^1$—[Si($Y^2$)$_p$($R^2$)$_{3-p}$];
each $Y^2$ is independently alkoxy, acyloxy, aryloxy, polyalkyleneoxy, halogen, hydroxyl, or —O-bonded to the fluorinated compound, forming the at least one siloxane bond;
p is 1, 2, or 3; and
q is 1, 2, or 3,
with the provisos that at least two independently selected —Si($Y^2$)$_p$($R^2$)$_{3-p}$ groups are present and that both $R^3$ groups may not be hydrogen.

In a twenty-fourth embodiment, the present disclosure provides the treated article of the twenty-third embodiment, wherein one $R^3$ is alkyl or hydrogen, and the other $R^3$ is —$R^1$—[Si($Y^2$)$_p$($R^2$)$_{3-p}$].

In a twenty-fifth embodiment, the present disclosure provides the treated article of any one of eighteenth to twenty-fourth embodiments, wherein the secondary or tertiary amino-functional compound is bis(3-trimethoxysilylpropyl)amine, N-methyl-bis(3-trimethoxysilylpropyl)amine, or N,N'-bis[3-trimethoxysilylpropyl]-ethylenediamine.

In a twenty-sixth embodiment, the present disclosure provides the treated article of any one of eighteenth to twenty-fifth embodiments, wherein p is 3.

In a twenty-seventh embodiment, the present disclosure provides the treated article of any one of eighteenth to twenty-sixth embodiments, wherein Rf comprises perfluorinated repeating units comprising at least one of —($C_nF_{2n}$O)—, —(CF(Z)O)—, —(CF(Z)$C_nF_{2n}$O)—, or —($C_nF_n$CF(Z)O)—; and wherein Z is a perfluoroalkyl group or a perfluoroalkoxy group, each of which is optionally interrupted by at least one ether linkage, and n is an integer from 1 to 12.

In a twenty-eighth embodiment, the present disclosure provides the treated article of the twenty-seventh embodiment, wherein z is 2, and Rf is —$CF_2O(CF_2O)_m(C_2F_4O)_bCF_2$—, —$CF_2O(C_2F_4O)_bCF_2$—, —$(CF_2)_3O(C_4F_8O)_b(CF_2)_3$—, or —CF(CF_3)—(OCF_2CF(CF_3))_bO—Rf'—O(CF(CF_3)CF_2O)_bCF(CF_3)—, and wherein Rf' is a perfluoroalkylene group optionally interrupted in chain by at least one ether or amine linkage, m is 1 to 50, and b is 3 to 40.

In a twenty-ninth embodiment, the present disclosure provides the treated article of the twenty-seventh embodiment, wherein Rf is $C_3F_7O(CF(CF_3)CF_2O)_aCF(CF_3)$—, $C_3F_7O(CF_2CF_2CF_2O)_aCF_2CF_2$—, or $CF_3O(C_2F_4O)_aCF_2$—, wherein a has an average value of 3 to 50, and wherein z is 1.

In a thirtieth embodiment, the present disclosure provides the treated article of any one of eighteenth to twenty-ninth embodiments, wherein the metal surface comprises at least one of chromium, a chromium alloy, iron, aluminum, copper, nickel, zinc, tin, stainless steel, or brass.

In a thirty-first embodiment, the present disclosure provides use of a secondary or tertiary amino-functional compound having at least two independently selected silane groups as a primer for a metal surface before treatment with a fluorinated compound represented by formula:

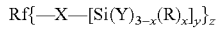

wherein:
Rf is a polyfluoropolyether group;
X is a divalent or trivalent organic linking group;
each Y is independently halogen, alkoxy, hydroxyl, acyloxy, polyalkyleneoxy, or aryloxy;
R is an alkyl group having up to 8 carbon atoms or a phenyl group;
x is 0 or 1 or 2;
y is a value from 1 to 8; and
z is 1 or 2.

In a thirty-second embodiment, the present disclosure provides the use of the thirty-first embodiment, wherein the fluorinated compound is represented by formula Rf{Q-X'—[Si(Y)$_{3-x}$($R^1$)$_x$]$_y$}$_z$, wherein
Q is a bond, —C(O)—N(R')—, —C(O)—O—, or —SO$_2$N(R')—, wherein R' is hydrogen or alkyl having up to 4 carbon atoms; and X' is a divalent or trivalent organic linking group comprising at least one of alkylene or arylalkylene, each of which is optionally interrupted by at least one functional group that is independently ether, thioether, sulfone, amine, ester, amide, carbamate, or urea.

In a thirty-third embodiment, the present disclosure provides the use of the thirty-second embodiment, wherein Q is —C(O)—N(R')—, wherein X' is divalent or trivalent alkylene that is optionally interrupted by at least one functional group that is independently ether, ester, carbamate, or amino.

In a thirty-fourth embodiment, the present disclosure provides the use of the thirty-third embodiment, wherein X' is

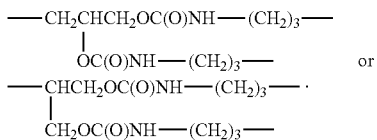

In a thirty-fifth embodiment, the present disclosure provides the use of any one of the thirty-first to thirty-fourth embodiments, wherein the secondary or tertiary amino-functional compound is represented by formula

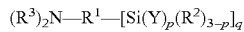

wherein $R^1$ is a multivalent alkylene group optionally interrupted by one or more —O— groups or up to three —$NR^3$— groups;

$R^2$ is alkyl or arylalkylenyl;

each $R^3$ is independently hydrogen, alkyl, arylalkylenyl, or —$R^1$—[Si(Y)$_p$(R$^2$)$_{3-p}$];

Y is alkoxy, acyloxy, aryloxy, polyalkyleneoxy, halogen, or hydroxyl;

p is 1, 2, or 3; and q is 1, 2, or 3, with the provisos that at least two independently selected —Si(Y)$_p$(R$^2$)$_{3-p}$ groups are present and that both $R^3$ groups may not be hydrogen.

In a thirty-sixth embodiment, the present disclosure provides the use of the thirty-fifth embodiment, wherein one $R^3$ is alkyl or hydrogen, and the other $R^3$ is —$R^1$—[Si(Y)$_p$(R$^2$)$_{3-p}$].

In a thirty-seventh embodiment, the present disclosure provides the use of any one of the thirty-first to thirty-sixth embodiments, wherein the secondary or tertiary amino-functional compound is bis(3-trimethoxysilylpropyl)amine, N-methyl-bis(3-trimethoxysilylpropyl)amine, or N,N'-bis[3-trimethoxysilylpropyl]-ethylenediamine.

In a thirty-eighth embodiment, the present disclosure provides the use of the thirty-fifth or thirty-sixth embodiment, wherein in the at least two independently selected silane groups, Y is methoxy, acetoxy, or chloro, and p is 3.

In a thirty-ninth embodiment, the present disclosure provides the use of any one of the thirty-first to thirty-eighth embodiments, wherein Rf comprises perfluorinated repeating units comprising at least one of —($C_nF_{2n}O$)—, —(CF(Z)O)—, —(CF(Z)$C_nF_{2n}O$)—, or —($C_nF_{2n}$CF(Z)O)—; and wherein Z is a perfluoroalkyl group or a perfluoroalkoxy group, each of which is optionally interrupted by at least one ether linkage, and n is an integer from 1 to 12.

In a fortieth embodiment, the present disclosure provides the use of the thirty-ninth embodiment, wherein z is 2, and Rf is —$CF_2O(CF_2O)_m(C_2F_4O)_bCF_2$—, —$CF_2O(C_2F_4O)_bCF_2$—, —$(CF_2)_3O(C_4F_8O)_b(CF_2)_3$—, or —CF(CF$_3$)—(OCF$_2$CF(CF$_3$))$_b$O—Rf'—O(CF(CF$_3$)CF$_2$O)$_b$CF(CF$_3$)—, and wherein Rf' is a perfluoroalkylene group optionally interrupted by at least one ether linkage, m is 1 to 50, and b is 3 to 40.

In a forty-first embodiment, the present disclosure provides the use of any one of the thirty-first to thirty-ninth embodiments, wherein Rf is $C_3F_7O(CF(CF_3)CF_2O)_aCF(CF_3)$—, $C_3F_7O(CF_2CF_2O)_aCF_2CF_2$—, or $CF_3O(C_2F_4O)_aCF_2$—, wherein a has an average value of 3 to 50, and wherein z is 1.

In a forty-second embodiment, the present disclosure provides the use of any one of the thirty-first to forty-first embodiments, wherein the fluorinated compound is present in a treatment composition in a range from 0.01 percent to 2 percent by weight, based on the total weight of the treatment composition.

In a forty-third embodiment, the present disclosure provides the use of any one of the thirty-first to forty-second embodiments, wherein the fluorinated compound is present in a treatment composition that further comprises an organic solvent.

In a forty-fourth embodiment, the present disclosure provides the use of any one of the thirty-first to forty-third embodiments, wherein the fluorinated compound is present in a treatment composition that further comprises an acid catalyst.

In a forty-fifth embodiment, the present disclosure provides the use of any one of the thirty-first to forty-fourth embodiments, wherein the metal substrate comprises at least one of chromium, a chromium alloy, iron, aluminum, copper, nickel, zinc, tin, stainless steel, or brass.

In a forty-sixth embodiment, the present disclosure provides the method, treated article, or use of any one of the first to forty-fifth embodiments, wherein y is 1 or 2.

In order that this disclosure can be more fully understood, the following examples are set forth. It should be understood that these examples are for illustrative purposes only, and are not to be construed as limiting this disclosure in any manner. All parts and percentages are by weight unless otherwise indicated.

EXAMPLES

Materials

3-Amino-1,2-propanediol, HOCH$_2$CH(OH)CH$_2$NH$_2$, (APD); tetraethoxy silane, Si(OCH$_2$CH$_3$)$_4$, (TEOS); Aminopropyltrimethoxysilane, NH$_2$(CH$_2$)$_3$Si(OCH$_3$)$_3$, (APTMS); 3-(triethoxysilyl)propyl isocyanate, OCN(CH$_2$)$_3$Si(OC$_2$H$_5$)$_3$, (NCO-silane); and tin(II) 2-ethylhexanoate, [CH$_3$(CH$_2$)$_3$CH(C$_2$H$_5$)CO$_2$]$_2$Sn, (TEH) were obtained from Sigma-Aldrich, St. Louis, Mo.

Bis(trimethoxysilyl propyl) amine, NH[(CH$_2$)$_3$Si(OCH$_3$)$_3$]$_2$, (BTMSPA) was obtained from Momentive, Columbus, Ohio.

Aminopropyltriethoxysilane, NH$_2$(CH$_2$)$_3$Si(OCH$_2$CH$_3$)$_3$, (APTES) was obtained from Fluka (Sigma-Aldrich Switzerland), Buchs, Switzerland.

C$_4$F$_9$OC$_2$H$_5$ was obtained from 3M Company, St. Paul, Minn., under the trade designation "HFE-7200".

Stainless steel test plates (dimensions 12 cm×7 cm), were obtained from Rocholl GmbH, Germany.

ALU 300: aluminum test plates (dimensions 12 cm×7 cm), were obtained from Hertel, Belgium.

Preparations

Preparation of HFPO-Oligomer Ester: $CF_3CF_2CF_2O(CF(CF_3)CF_2O)_nCF(CF_3)COOCH_3$ (where n=3 to 20; $MW_{avg}$ ~1232) can be prepared starting from hexafluoropropylene epoxide and trifluoroacetyl fluoride as given in U.S. Pat. No. 3,250,808 (Example XIII), followed by esterification with methanol as given in U.S. Pat. No. 3,250,808 (Example V).

Preparation of α,ω HFPO-Oligomer Diester $CH_3OCOCF(CF_3)(OC_3F_6)_nOCF_2CF_2CF_2O(C_3F_6O)_nCF(CF_3)COOCH_3$: In a 600 mL Parr reactor was charged 47 g (0.24 mol) of perfluorosuccinyl fluoride, available from Exfluor Research Corp., Round Rock, Tex., 7 g of KF (0.12 mol) and 100 g of tetraglyme, available from Aldrich Company, and cooled to 0° C. followed by addition of 548 g (3.3 mol) of hexafluoropropylene oxide, available from E.I. du Pont de Nemours and Co. (Wilmington, Del.) over four hours as described in U.S. Pat. No. 3,250,807 (Fritz et al.). A total of six reactions were completed, combined and reacted with excess methanol, and water washed to isolate 2540 g of oligomeric hexafluoropropylene oxide dimethyl ester of 2280 g/mol number average molecular weight.

Preparation of FS-1: HFPO-oligomer ester/APD/NCO-silane; 1/1/2

A three necked 100 mL round bottom flask fitted with a stirrer, heating mantle, thermometer and condenser, was charged with HFPO-oligomer ester (12.3 g; 0.01 mol) and APD (0.9 g; 0.01 mol). Reaction was done under nitrogen. The temperature of the mixture was elevated to 40° C. and held for 16 hrs. NCO-silane (5.0 g; 0.02 mol) was then added along with one drop of TEH (about 0.05 g) and the resulting mixture was heated overnight at 80° C. The reaction was checked for residual isocyanate using standard IR techniques. The viscous liquid reaction product was dissolved in HFE-7200 to obtain a 10% solids solution.

Preparation of FS-2: HFPO-oligomer ester/APTMS 1/1

The sample was prepared essentially according to the method described in U.S. Pat. No. 3,646,085, Example 1, with modifications as outlined below:

A 250 ml polymerization bottle was charged with 178.83 g HFPO-oligomer ester followed by slow addition of 26.85 g 3-aminopropyl trimethoxysilane (APTMS). The polymerization bottle was sealed and run for 16 hours at 75° C. in a preheated Launder-o-meter. The formed methanol was distilled off at 70° C. with a rotary evaporator using waterjet vacuum followed by oil pump vacuum. A clear, semi-viscous colorless liquid was obtained in 98% isolated yield. IR and NMR-spectroscopy confirmed the product structure and completion of the reaction.

Preparation of FS-3: α,ω HFPO-oligomer diester/APTES 1/2

A 100 ml polymerization bottle was charged with 60 g α,ω HFPO-oligomer diester followed by slow addition of 17.68 g 3-aminopropyl triethoxysilane (APTES).

The polymerization bottle was sealed and run for 3 hours at 80° C. in a preheated Launder-o-meter. Another 1.77 g APTES was added and the reaction was continued for 20 hours at 85° C. The formed methanol was distilled off at 85° C. with a rotary evaporator using waterjet vacuum followed by oil pump vacuum. A clear, semi-viscous yellow-brown liquid was obtained. IR and NMR-spectroscopy confirmed the product structure and completion of the reaction.

Test Methods

Respective data of tests shown in the following Examples and Comparative Examples are based on the following methods of measurement and evaluation criteria:

Abrasion Method

Abrasion tests were done 24 hours after application of the treatment compositions. Two abrasion methods were applied and indicated in the examples as 'Rubbing' or 'Abrasion' respectively.

'Rubbing' refers to an abrasion test that was accomplished by rubbing the treated substrate with a paper towel for 10 seconds.

'Abrasion' refers to an alternative abrasion test, wherein the treated substrates were abraded during 1000 cycles with the yellow side of a water-wet sponge obtained from 3M Company, St. Paul, Minn. under the trade designation "SCOTCHBRITE" using a Scrub Resistance Tester commercially available from Erichsen GmbH & Co. KG, Hemer, Germany.

Contact Angle Measurement

The treated substrates were tested for their static water contact angles using a DSA 100 Contact Angle Analyzer (Krüss GmbH). The contact angles were measured before (initial) and after abrasion ('rubbing' or 'abrasion'). Contact angles with water were measured at least 24 hrs after application or after abrasion. The values recorded are the mean values of 4 measurements and are reported in degrees.

Stain Repellency and Stain Release Evaluations

In order to measure the stain repellency and/or stain release properties, stain stripes of 1 cm×5 cm were applied on the treated and untreated substrates using an Artline Blue permanent marker.

Stain Repellency Evaluation

The marker stain repellency was evaluated when applying the stain and was rated using a number between 1 and 5, where 1 indicates that the "marker drops fully beaded up" and 5 refers to "marker paint wets the surface completely".

Stain Release Evaluation

After application of the stain, the test substrate was first dried for 30 minutes at room temperature, after which ease of stain removal and stain resistance was evaluated.

a. Ease of Stain Removal

The ease of stain removal was evaluated by rubbing the stained surface for 20 seconds with a dry cotton cloth. The stain removal was rated on a scale from 1 to 3 wherein 1 means "easy removal", 2: medium removal and 3: difficult removal.

b. Stain Resistance

After the stain was removed by rubbing for 20 seconds with a dry cotton cloth (ease of stain removal test), the residual stain was visually rated using a number between 1 and 8, where 1 means "completely stained" and 8 refers to "no stain left".

Release Properties

The release properties were evaluated by measuring 180° peel adhesion. The 180° peel was measured using a Rycobel peel tester, available from Thwing-Albert Instruments, Co. A piece of tape obtained from 3M Company under the trade designation "3M SCOTCH MAGIC TAPE 810" (19 mm width) was applied to the coated substrate. The tape was rolled over four times with a stainless steel roll having 1 kg weight. The 180° peel was tested using a velocity of 0.3 m/min. The results are expressed in Newton/inch (N/inch) and are the average of 3 peel adhesion measurements.

Examples Ex-1 and Ex-2, Comparative Examples C-1 to C-4, and Reference Examples REF-1, REF-2, and REF-3

Primer compositions were made by dissolving 0.1% by weight of the primer indicated in Table 1, below, in isopropylalcohol (IPA).

Treatment compositions based on FS-1 were prepared by placing 97.8 parts dry isopropyl alcohol (IPA) in a jar. 0.2 parts 18% aqueous HCl and 2 parts of a 10% solution of FS-1 in HFE-7200 were added. The mixture was gently mixed to obtain a slightly hazy ready-to-use treatment formulation that remained stable for several months.

Stainless steel plates were first cleaned with a wipe saturated with IPA. After cleaning the substrates were air dried.

The substrates of the examples and the comparative examples were treated in a two-step process. In a first step, a 0.1% primer composition in IPA was sprayed (2 crosses) onto the cleaned substrates using an air-atomized spray gun at a pressure of 2 bar and a flow rate of 40 mL/min. The primer layer was dried at room temperature for 3 hours or at 120° C. for 10 minutes as indicated in Table 1, below. In a second step, the treatment composition based on FS-1 was sprayed (2 crosses) onto the dried primer layer using an air-atomized spray gun at a pressure of 2 bar and a flow rate of 40 mL/min. The fluorinated silane layer was dried at room temperature for 48 hours or at higher temperature as indicated in Table 1, below.

Reference example REF-1 was an uncoated stainless steel plate. The substrates of reference examples REF-2 and REF-3 were treated with the treatment composition comprising FS-1, but without first applying a primer layer. The composition comprising fluorinated silane was sprayed (2 crosses) onto the cleaned substrates using an air-atomized spraygun at a pressure of 2 bar and a flow rate of 40 mL/min. The fluorinated silane layer was dried at room temperature for 48 hours or at higher temperature as indicated in Table 1, below.

TABLE 1

| | Treatment conditions | | | |
|---|---|---|---|---|
| | Primer (0.1% solids) | Drying primer layer | Fluorinated silane (0.2% solids) | Drying fluorinated silane layer |
| Ex-1 | BTMSPA | 3 hrs RT | FS-1 | 48 hrs RT |
| Ex-2 | BTMSPA | 10 min 120° C. | FS-1 | 10 min 120° C. |
| REF-1 | / | / | / | / |
| REF-2 | / | / | FS-1 | 48 hrs RT |
| REF-3 | / | / | FS-1 | 10 min 120° C. |
| C-1 | APTMS | 3 hrs RT | FS-1 | 48 hrs RT |
| C-2 | APTMS | 10 min 120° C. | FS-1 | 10 min 120° C. |
| C-3 | TEOS | 3 hrs RT | FS-1 | 48 hrs RT |
| C-3 | TEOS | 10 min 120° C. | FS-1 | 10 min 120° C. |

Examples Ex-1 and Ex-2, Comparative Examples C-1 to C-4, and Reference Examples REF-1, REF-2, and REF-3 were evaluated before (initial) and after abrasion by rubbing ('rubbing'). The static water contact angles as well as the stain resistance/repellency using an Artline blue permanent marker were measured according to the methods described above. The results are given in Table 2, below.

TABLE 2

Properties of treated and untreated stainless steel substrates

| | Static water contact angles (°) | | Stain repellency - stain resistance versus Artline Blue permanent marker | | | | | |
|---|---|---|---|---|---|---|---|---|
| | | | Initial | | | After 'rubbing' | | |
| | Initial | After rubbing | Stain repellency | Ease stain removal | Stain resistance | Stain repellency | Ease stain removal | Stain resistance |
| Ex-1 | 110 | 101 | 3 | 1 | 8 | 1 | 2 | 8 |
| Ex-2 | 112 | 110 | 1 | 1 | 8 | 1 | 1 | 8 |
| REF-1 | 42 | <40 | 5 | 3 | 2 | 5 | 3 | 1 |
| REF-2 | 111 | 96 | 4 | 1 | 7 | 5 | 2 | 4 |
| REF-3 | 112 | 92 | 2 | 2 | 8 | 4 | 3 | 6 |
| C-1 | 109 | 81 | 3 | 1 | 7 | 3 | 2 | 4 |
| C-2 | 108 | 92 | 1 | 2 | 8 | 3 | 2 | 5 |
| C-3 | 111 | 88 | 4 | 1 | 6 | 4 | 2 | 5 |
| C-4 | 110 | 77 | 1 | 3 | 4 | 4 | 2 | 3 |

Example Ex-3, Comparative Example C-5 and References REF-4 and REF-5

In example Ex-3, aluminum test plates were cleaned and treated in two steps according to the general procedure described above for Examples Ex-1 and Ex-2, Comparative Examples C-1 to C-4, and Reference Examples REF-1, REF-2, and REF-3. In a first step a primer composition of BTMSPA (0.1% in IPA; drying conditions: 3 hrs RT) was applied and in a second step after drying of the primer layer, a treatment composition based on fluorinated silane FS-1 as given above was applied. Comparative example C-5 was prepared in the same way, but with a primer composition of APTMS instead of BTMSPA. Reference example REF-4 refers to an untreated aluminum test plate. Reference REF-5 was obtained by treating an aluminum plate with a treatment composition comprising FS-1, but without first applying a primer layer. The treated and untreated substrates were evaluated before (initial) and after abrasion test with rubbing ('rubbing'). 180° peel test as well as stain resistance/repellency using an Artline blue permanent marker were done according to the methods outlined above. The results are given in Table 3, below.

TABLE 3

Properties of treated and untreated aluminum plates

| | 180° peel (N/inch) | | Stain repellency - stain resistance versus Artline Blue permanent marker | | | | | |
|---|---|---|---|---|---|---|---|---|
| | | | Initial | | | After 'rubbing' | | |
| | | | | Ease | | | Ease | |
| | Initial | After rubbing | Stain repellency | stain removal | Stain resistance | Stain repellency | stain removal | Stain resistance |
| Ex-3 | 1.8 | 7.7 | 2 | 1 | 8 | 2 | 1 | 8 |
| C-5 | 2.5 | 12.6 | 2 | 1 | 8 | 4 | 3 | 3 |
| REF-4 | 16.9 | 18.7 | 5 | 3 | 5 | 5 | 3 | 4 |
| REF-5 | 2.3 | 9.8 | 1 | 1 | 8 | 5 | 2 | 4 |

Examples Ex-4 to Ex-6 and Reference Examples REF-6 to REF-9

Treatment compositions based on FS-2 and FS-3 were prepared by placing 99.6 parts dry isopropyl alcohol (IPA) in a jar. 0.2 parts 18% aqueous HCl and 0.2 parts fluorinated silane FS-2 or FS-3 were added. The mixture was gently mixed to obtain a slightly hazy ready-to-use treatment formulation that remained stable for several months.

In Examples Ex-4 to Ex-6 stainless steel plates were cleaned and treated in a two step process according to the general procedure described above for Examples Ex-1 and Ex-2, Comparative Examples C-1 to C-4, and Reference Examples REF-1, REF-2, and REF-3 and with the treatment compositions as given in Table 4. Reference REF-6 refers to an uncoated stainless steel plate. References REF-7 to REF-9 were made by treating stainless steel plates with a treatment composition comprising FS-1 or FS-2, but without first applying a primer layer. In all cases the drying of the different layers was done at room temperature for 48 hours. The treated and untreated substrates were evaluated before (initial) and after abrasion test using the Erichsen abrasion tester ('abrasion'). The static water contact angles as well as the stain resistance/repellency using an Artline blue permanent marker were measured according to the methods described above. The results are given in Table 4, below.

TABLE 4

| | Primer (0.1% solids) | FS (0.2% solids) | Static water contact angle (°) | | Stain repellency - stain resistance versus Artline Blue permanent marker | | | | | |
|---|---|---|---|---|---|---|---|---|---|---|
| | | | | | Initial | | | After 'abrasion' | | |
| | | | | | | Ease | | | Ease | |
| | | | Initial | After abrasion | Stain repellency | stain removal | Stain resistance | Stain repellency | stain removal | Stain resistance |
| REF-6 | / | / | 55 | 65 | 5 | 3 | 2 | 5 | 3 | 1 |
| Ex-4 | BTMSPA | FS-1 | 98 | 88 | 1 | 1 | 8 | 3 | 2 | 8 |
| REF-7 | / | FS-1 | 78 | 78 | 2 | 2 | 4 | 5 | 3 | 3 |
| Ex-5 | BTMSPA | FS-2 | 107 | 97 | 1 | 1 | 8 | 1 | 1 | 8 |
| REF-8 | / | FS-2 | 80 | 80 | 1 | 3 | 4 | 4 | 3 | 3 |
| Ex-6 | BTMSPA | FS-3 | 95 | 93 | 1 | 2 | 8 | 1 | 1 | 8 |
| REF-9 | / | FS-3 | 85 | 75 | 1 | 3 | 3 | 5 | 3 | 3 |

Examples Ex-7 and Ex-8 and Comparative Examples C-6 and C-7

Treatment compositions comprising both primer and fluorinated silane FS-1 were prepared by placing 97.7 parts dry isopropyl alcohol (IPA) in a jar. 0.1 parts primer, 0.2 parts 18% aqueous HCl and 2 parts of a 10% solution of FS-1 in HFE-7200 were added. The mixtures were gently mixed to obtain slightly hazy ready-to-use treatment formulations.

Treatment compositions comprising both primer and fluorinated silane FS-2 were prepared by placing 97.9 parts dry isopropyl alcohol (IPA) in a jar. 0.1 parts primer and 0.2 parts 18% aqueous HCl and 0.2 parts of a 10% solution of FS-2 were added. The mixtures were gently mixed to obtain slightly hazy ready-to-use treatment formulations.

In Examples Ex-7 and Ex-8 and Comparative Examples C-6 and C-7 stainless steel plates were cleaned as described above in Examples Ex-1 and Ex-2, Comparative Examples C-1 to C-4, and Reference Examples REF-1, REF-2, and REF-3 and then treated in a one step process by applying the treatment compositions as given in Table 5. The treatment compositions in IPA were sprayed (2 crosses) onto the cleaned substrates using an air-atomized spraygun at a pressure of 2 bar and a flow rate of 40 mL/min. The treated substrates were dried at room temperature for 48 hours. The treated substrates were evaluated before (initial) and after abrasion test using the Erichsen abrasion tester ('abrasion'). The static water contact angles as well as the stain resistance/repellency using an Artline blue permanent marker were evaluated according to the test methods described above. The results are given in Table 5, below.

The complete disclosures of the patents, patent documents and publications cited herein are incorporated by reference in their entirety as if each were individually incorporated. In case of conflict, the present specification, including definitions, shall control. Various modifications and alterations to this invention will become apparent to those skilled in the art without departing from the scope and spirit of this invention. Illustrative embodiments and examples are provided as examples only and are not intended to limit the scope of the present invention. The scope of the invention is limited only by the claims set forth as follows.

What is claimed is:

1. A method of making a treated article having a metal surface, the method comprising:
   treating the metal surface with a primer composition comprising a secondary or tertiary amino-functional compound having at least two independently selected silane groups to provide a primed metal surface; and
   subsequently treating the primed metal surface with a treatment composition comprising a fluorinated compound represented by formula:

Rf{Q-X'—[Si(Y)$_{3-x}$(R)$_x$]$_y$}$_z$ 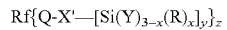

wherein:
   Rf is a polyfluoropolyether group;
   Q is —C(O)—N(R')—, —C(O)—O—, or —SO$_2$N(R')—, wherein R' is hydrogen or alkyl having up to 4 carbon atoms; and
   X' is a divalent or trivalent organic linking group comprising at least one of alkylene or arylalkylene interrupted by at least one carbamate or urea;

TABLE 5

| | FS (0.2% solids) + primer (0.1% solids) | Static water contact angle (°) | | Stain repellency - stain resistance versus Artline Blue permanent marker | | | | | |
|---|---|---|---|---|---|---|---|---|---|
| | | | | Initial | | | After 'abrasion' | | |
| | | | | | Ease | | | Ease | |
| | | Initial | After abrasion | Stain repellency | stain removal | Stain resistance | Stain repellency | stain removal | Stain resistance |
| Ex-7 | FS-1 + BTMSPA | 101 | 88 | 1 | 1 | 8 | 3 | 1 | 8 |
| C-6 | FS-1 + APTMS | 58 | 55 | 4 | 3 | 8 | 1 | 3 | 3 |
| Ex-8 | FS-2 + BTMSPA | 104 | 99 | 1 | 1 | 8 | 1 | 1 | 8 |
| C-7 | FS-2 + APTMS | 53 | 33 | 2 | 2 | 8 | 3 | 3 | 2 | each Y is independently halogen, alkoxy, hydroxyl, acyloxy, polyalkyleneoxy, or aryloxy;

R is an alkyl group having up to 8 carbon atoms or a phenyl group;

x is 0 or 1 or 2;

y is a value from 1 to 8; and z is 1 or 2.

2. The method of claim 1, wherein in the fluorinated compound represented by formula $Rf\{Q-X'—[Si(Y)_{3-x}(R)_x]_y\}_z$, Q is —C(O)—N(R')—, wherein R' is hydrogen or alkyl having up to 4 carbon atoms; and X' is a divalent or trivalent organic linking group comprising alkylene interrupted by at least one carbamate or urea.

3. The method of claim 2, wherein Q is —C(O)—N(R')—, and X' is divalent or trivalent alkylene that is interrupted by at least one carbamate.

4. The method of claim 3, wherein X' is

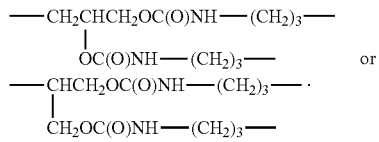

5. The method of claim 1, wherein the secondary or tertiary amino-functional compound is represented by formula

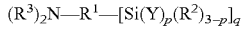

wherein $R^1$ is a multivalent alkylene group or a multivalent alkylene group interrupted by one or more —O— groups or up to three —$NR^3$— groups;

$R^2$ is alkyl or arylalkylenyl;

each $R^3$ is independently hydrogen, alkyl, arylalkylenyl, or —$R^1$—[$Si(Y)_p(R^2)_{3-p}$];

Y is alkoxy, acyloxy, aryloxy, polyalkyleneoxy, halogen, or hydroxyl;

p is 1, 2, or 3; and q is 1, 2, or 3, with the provisos that at least two independently selected —$Si(Y)_p(R^2)_{3-p}$ groups are present and that both $R^3$ groups may not be hydrogen.

6. The method of claim 5, wherein one $R^3$ is alkyl or hydrogen, and the other $R^3$ is —$R^1$—[$Si(Y)_p(R^2)_{3-p}$].

7. The method of claim 1, wherein the secondary or tertiary amino-functional compound is bis(3-trimethoxysilylpropyl)amine, N-methyl-bis(3-trimethoxysilylpropyl)amine, or N,N'-bis[3-trimethoxysilylpropyl]-ethylenediamine.

8. The method of claim 1, wherein Rf comprises perfluorinated repeating units comprising at least one of —($C_nF_{2n}O$)—, —(CF(Z)O)—, —(CF(Z)$C_nF_{2n}$O)—, or —($C_nF_{2n}$CF(Z)O)—; and wherein Z is a perfluoroalkyl group, a perfluoroalkoxy group, or a perfluoroalkyl group or a perfluoroalkoxy group interrupted by at least one ether linkage, and n is an integer from 1 to 12.

9. The method of claim 8, wherein z is 2, and Rf is —$CF_2O(CF_2O)_m(C_2F_4O)_bCF_2$—, —$CF_2O(C_2F_4O)_bCF_2$—, —$(CF_2)_3O(C_4F_8O)_b(CF_2)_3$—, or —$CF(CF_3)$—($OCF_2CF(CF_3)$)$_b$O—Rf'—O($CF(CF_3)CF_2O$)$_b$$CF(CF_3)$—, and wherein Rf' is a perfluoroalkylene group or a perfluoroalkylene group interrupted by at least one ether or amine linkage, m is 1 to 50, and b is 3 to 40.

10. The method of claim 1, wherein Rf is $C_3F_7O(CF(CF_3)CF_2O)_aCF(CF_3)$—, $C_3F_7O(CF_2CF_2CF_2O)_aCF_2CF_2$—, or $CF_3O(C_2F_4O)_aCF_2$—, wherein "a" has an average value of 3 to 50, and wherein z is 1.

11. The method of claim 1, wherein the fluorinated compound is present in the treatment composition in a range from 0.01 percent to 2 percent by weight, based on the total weight of the treatment composition, and wherein the treatment composition further comprises at least one of an organic solvent or an acid catalyst.

12. A treated article treated according to the method of claim 1, the treated article comprising:

a metal surface, wherein a layer is formed on at least a portion of the metal surface, wherein the layer comprises a secondary or tertiary amino-functional compound including at least one siloxane and at least one other group selected from the group consisting of siloxane, silanol, and silane; and a fluorinated compound bonded to the secondary or tertiary amino-functional compound, wherein the fluorinated compound is represented by formula:

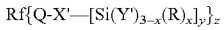

wherein:

Rf is a polyfluoropolyether group;

Q is —C(O)—N(R')—, —C(O)—O—, or —$SO_2N$(R')—, wherein R' is hydrogen or alkyl having up to 4 carbon atoms; and X' is a divalent or trivalent organic linking group comprising at least one of alkylene or arylalkylene interrupted by at least one carbamate or urea;

each Y' is independently halogen, alkoxy, hydroxyl, acyloxy, polyalkyleneoxy, aryloxy, or —O— bonded to the secondary or tertiary amino-functional compound, forming the at least one siloxane;

R is an alkyl group having up to 8 carbon atoms or a phenyl group;

x is 0 or 1 or 2;

y is a value from 1 to 8; and z is 1 or 2.

13. A method of making a treated article having a metal surface, the method comprising treating the metal surface with a treatment composition comprising:

a secondary or tertiary amino-functional compound having at least two independently selected silane groups; and a fluorinated compound represented by formula:

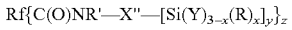

wherein:

Rf is a polyfluoropolyether group;

X" is a divalent or trivalent organic linking group comprising at least one of alkylene or arylalkylene, each of which is interrupted by at least one carbamate or urea;

each Y is independently halogen, alkoxy, hydroxyl, acyloxy, polyalkyleneoxy, or aryloxy;

R is an alkyl group having up to 8 carbon atoms or a phenyl group;

R' is hydrogen or alkyl having up to 4 carbon atoms;

x is 0 or 1 or 2;

y is a value from 1 to 8; and z is 1 or 2.

14. The method of claim 1, wherein the metal surface comprises at least one of chromium, a chromium alloy, iron, aluminum, copper, nickel, zinc, tin, stainless steel, or brass.

15. The treated article of claim 12, wherein in the fluorinated compound represented by formula Rf{Q-X'—[Si(Y')$_{3-x}$(R)$_x$]$_y$}$_z$, Q is —C(O)—N(R')—, wherein R' is hydrogen or alkyl having up to 4 carbon atoms; and X' is a divalent or trivalent organic linking group comprising alkylene interrupted by at least one carbamate or urea.

16. The treated article of claim 12, wherein Q is —C(O)—N(R')—, and X' is divalent or trivalent alkylene that is interrupted by at least one carbamate.

17. The treated article of claim 12, wherein the secondary or tertiary amino-functional compound is represented by formula

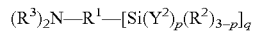

wherein

R$^1$ is a multivalent alkylene group optionally interrupted by one or more —O— groups or up to three —NR$^3$— groups;

R$^2$ is alkyl or arylalkylenyl;

each R$^3$ is independently hydrogen, alkyl, arylalkylenyl, or —R$^1$—[Si(Y$^2$)$_p$(R$^2$)$_{3-p}$];

each Y$^2$ is independently alkoxy, acyloxy, aryloxy, polyalkyleneoxy, halogen, hydroxyl, or —O— bonded to the fluorinated compound, forming the at least one siloxane;

p is 1, 2, or 3; and q is 1, 2, or 3, with the provisos that at least two independently selected —Si(Y$^2$)$_p$(R$^2$)$_{3-p}$ groups are present and that both R$^3$ groups may not be hydrogen.

18. The treated article of claim 12, wherein one R$^3$ is alkyl or hydrogen, and the other R$^3$ is —R$^1$—[Si(Y$^2$)$_p$(R$^2$)$_{3-p}$].

19. The treated article of claim 12, wherein Rf comprises perfluorinated repeating units comprising at least one of —(C$_n$F$_{2n}$O)—, —(CF(Z)O)—, —(CF(Z)C$_n$F$_{2n}$O)—, or —(C$_n$F$_{2n}$CF(Z)O)—; and wherein Z is a perfluoroalkyl group or a perfluoroalkoxy group, each of which is optionally interrupted by at least one ether linkage, and n is an integer from 1 to 12.

20. The treated article of claim 12, wherein the metal surface comprises at least one of chromium, a chromium alloy, iron, aluminum, copper, nickel, zinc, tin, stainless steel, or brass.

* * * * *

UNITED STATES PATENT AND TRADEMARK OFFICE
CERTIFICATE OF CORRECTION

PATENT NO. : 10,675,658 B2
APPLICATION NO. : 15/126655
DATED : June 9, 2020
INVENTOR(S) : Frans Audenaert Page 1 of 2

It is certified that error appears in the above-identified patent and that said Letters Patent is hereby corrected as shown below:

In the Specification

Column 2
Line 24, delete "—O-bonded" and insert -- —O— bonded --, therefor.
Line 39, delete "—C(O)—N(R)—," and insert -- —C(O)—N(R′)—, --, therefor.

Column 3
Line 3, delete "—O-bonded" and insert -- —O— bonded --, therefor.
Line 5, delete "—O-bonded" and insert -- —O— bonded --, therefor.

Column 4
Line 42, after "aluminum)" insert -- . --.

Column 6
Line 17, delete "—Si—O—Si-bond." and insert -- —Si—O—Si— bond. --, therefor.
Lines 21-22, delete "—Si—O—Si-bond." and insert -- —Si—O—Si— bond. --, therefor.

Column 8
Line 41, delete "—Rf—" and insert -- —Rf′— --, therefor.
Line 41, delete "Rf" and insert -- Rf′ --, therefor.

Column 10
Line 26, delete "acyloxy" and insert -- aryloxy --, therefor.
Line 28, delete "—O-bonded" and insert -- —O— bonded --, therefor.

Column 11
Line 27, delete "—O-bonded" and insert -- —O— bonded --, therefor.
Lines 28-29, delete "—O-bonded" and insert -- —O— bonded --, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*

Column 20
Line 48, delete "—O-bonded" and insert -- —O— bonded --, therefor.

Column 21
Line 36, delete "Y'" and insert -- $Y^1$ --, therefor.
Line 37, delete "—O-bonded" and insert -- —O— bonded --, therefor.
Lines 39-40, delete "—O-bonded" and insert -- —O— bonded --, therefor.
Line 61, delete "—O-bonded" and insert -- —O— bonded --, therefor.

Column 22
Line 21, delete "—($C_nF_n$CF(Z)O)—;" and insert -- —($C_nF_{2n}$CF(Z)O)—; --, therefor.
Line 28, delete "—Rf—" and insert -- —Rf'— --, therefor.

Column 24
Line 10, delete "($CF_2CF_2O)_a$" and insert -- ($CF_2CF_2CF_2O)_a$ --, therefor.

Column 25
Line 11, delete "$CF_2CF_2CF_2O$" and insert -- $CF_2CF_2CF_2CF_2O$ --, therefor.